US008085140B2

(12) United States Patent
Mochizuki et al.

(10) Patent No.: US 8,085,140 B2
(45) Date of Patent: Dec. 27, 2011

(54) TRAVEL INFORMATION PROVIDING DEVICE

(75) Inventors: Makoto Mochizuki, Tokyo (JP);
Hirofumi Nishimura, Kanagawa (JP);
Hiroyuki Kubotani, Kanagawa (JP);
Hisashi Kurokawa, Kanagawa (JP)

(73) Assignee: Panasonic Corporation, Osaka (JP)

( * ) Notice: Subject to any disclaimer, the term of this patent is extended or adjusted under 35 U.S.C. 154(b) by 321 days.

(21) Appl. No.: 12/439,766

(22) PCT Filed: Sep. 4, 2007

(86) PCT No.: PCT/JP2007/067211
§ 371 (c)(1),
(2), (4) Date: May 6, 2009

(87) PCT Pub. No.: WO2008/029802
PCT Pub. Date: Mar. 13, 2008

(65) Prior Publication Data
US 2009/0303078 A1     Dec. 10, 2009

(30) Foreign Application Priority Data

Sep. 4, 2006 (JP) .................................. 2006-239591

(51) Int. Cl.
*B60Q 1/00* (2006.01)
(52) U.S. Cl. .................. 340/438; 340/435; 340/576
(58) Field of Classification Search .................. 340/435, 340/438, 439, 461, 576, 901, 903, 933, 815.75; 382/118, 154
See application file for complete search history.

(56) References Cited

U.S. PATENT DOCUMENTS 5,796,350 A  *  8/1998  Fuse ..................... 340/815.75
7,403,124 B2 *  7/2008  Arakawa et al. .............. 340/576
7,710,246 B2 *  5/2010  Arakawa et al. .............. 340/435
7,932,819 B2 *  4/2011  Arie et al. ..................... 340/461
2010/0054580 A1 *  3/2010  Miyoshi et al. ............... 382/154

FOREIGN PATENT DOCUMENTS

| JP | 7-167668 A | 7/1995 |
| JP | 10-246640 A | 9/1998 |
| JP | 2929927 B2 | 5/1999 |
| JP | 2000-003499 A | 1/2000 |
| JP | 2001-357498 A | 12/2001 |

OTHER PUBLICATIONS

English language Abstract of JP 7-167668 A, Jul. 4, 1995.
Mita et al., "Detection System of Gaze Direction for Excessive Concentration through Cellular Phone Use and Inattention," 2002 ITS World Congress Paper, (2002).
Miura et al., "Drivers' Visual Attention Characteristics," Automotive Technology, vol. 58, No. 12, pp. 10-15, (2004).

* cited by examiner

Primary Examiner — Van T. Trieu
(74) Attorney, Agent, or Firm — Greenblum & Bernstein, P.L.C.

(57) ABSTRACT

A traveling information providing device is provided in which a surrounding information corrector acquires surrounding information on the condition surrounding a vehicle equipped with the device. An object extractor extracts a safety confirmation object the safety of which must be confirmed by a driver from the surrounding information acquired by the surrounding information collector. A line-of-sight detector detects a line-of-sight direction of the driver. A visibility calculator receives the extracted safety confirmation object and the line-of-sight direction of the driver and calculates visibility in consideration of the driver's peripheral vision with respect to the safety confirmation object according to the distance or the angle from the driver's line-of-sight direction to the object. An information presenter presents safety confirmation to the driver depending on the calculated visibility.

13 Claims, 16 Drawing Sheets

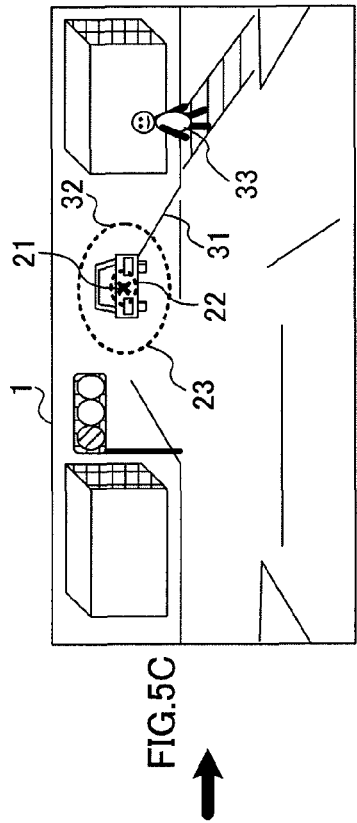
FIG.5A
FIG.5C
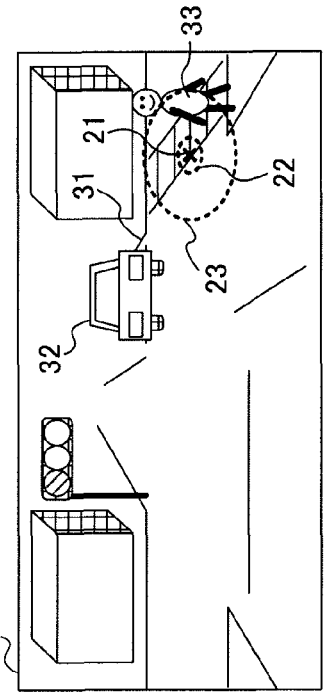
FIG.5B
| | VISIBILITY | CUMULATIVE VISIBILITY |
|---|---|---|
| ONCOMING VEHICLE | 0.5 | 0.5 |
| PEDESTRIAN | 0.0 | 0.0 |
FIG.5D
| | VISIBILITY | CUMULATIVE VISIBILITY |
|---|---|---|
| ONCOMING VEHICLE | 1.0 | 1.5 |
| PEDESTRIAN | 0.0 | 0.0 |
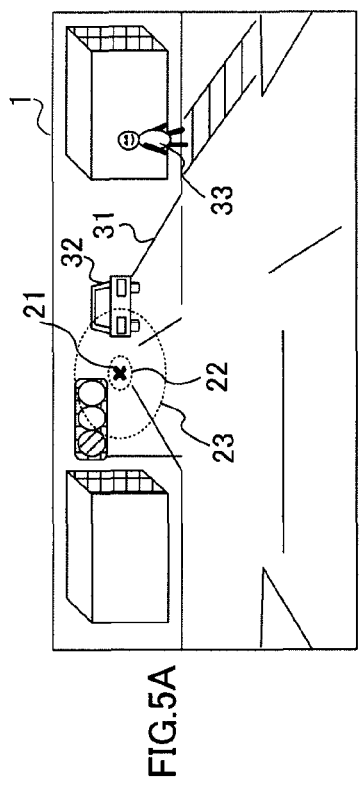
FIG.5E
FIG.5G
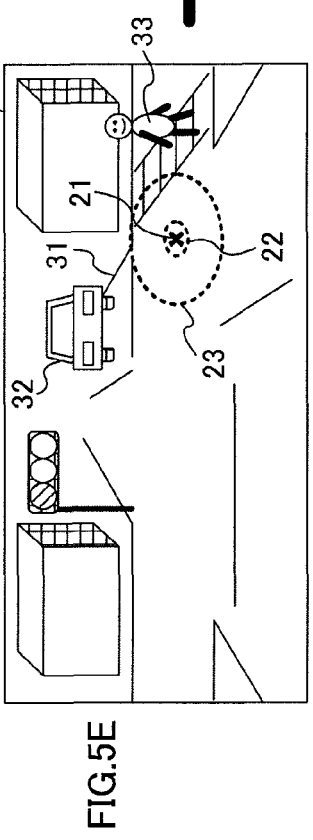
FIG.5F
| | VISIBILITY | CUMULATIVE VISIBILITY |
|---|---|---|
| ONCOMING VEHICLE | 0.0 | 1.5 |
| PEDESTRIAN | 0.0 | 0.0 |
FIG.5H
| | VISIBILITY | CUMULATIVE VISIBILITY |
|---|---|---|
| ONCOMING VEHICLE | 0.0 | 1.5 |
| PEDESTRIAN | 0.5 | 0.5 |

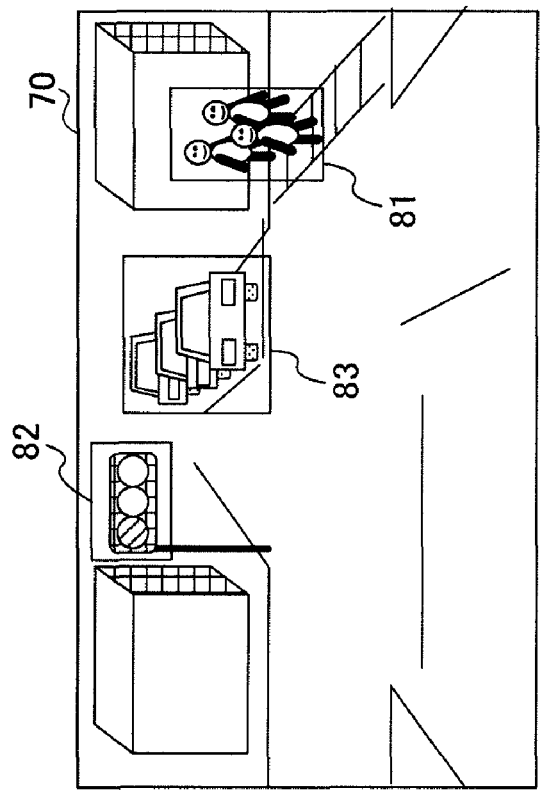
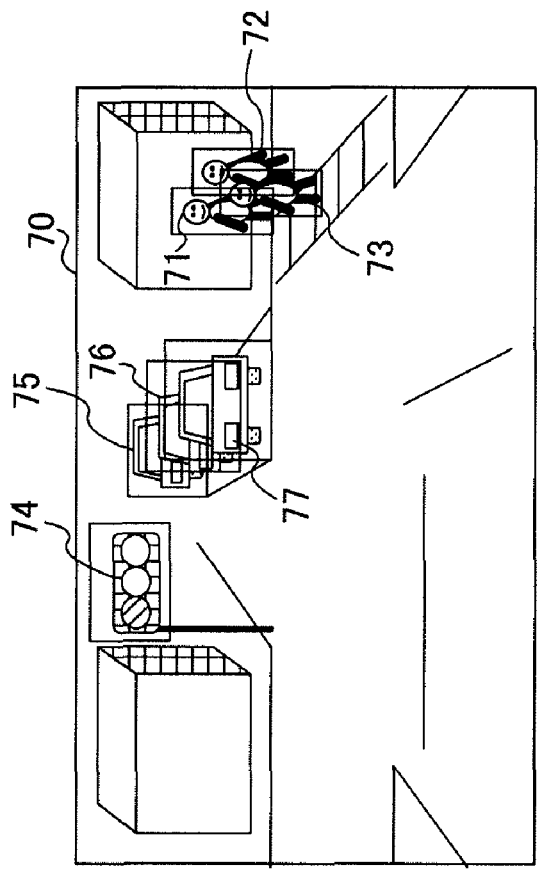
FIG. 14B
FIG. 14A

TRAVEL INFORMATION PROVIDING DEVICE

TECHNICAL FIELD

The present invention relates to a traveling information providing apparatus that uses a driver's line of sight.

BACKGROUND ART

Heretofore, various kinds of apparatus have been proposed that determine a driver's degree of recognition of an object in the periphery of a vehicle from the direction of the object and the driver's line-of-sight direction, and present warning information if the degree of recognition is low.

For example, a traveling information providing apparatus shown in Patent Document 1 calculates attentive viewing frequency at which a driver's attentive viewing direction (gaze direction, direction of gaze) and a necessary attentive viewing direction in which safety should be confirmed by the driver while driving coincide, and decides a notification level of information of which the driver should be notified based on that attentive viewing frequency.

That is to say, this traveling information providing apparatus judges a degree of recognition of an object using a driver's point of attentive viewing (point of gaze, point of regard) and a point of attentive viewing with respect to an object necessary for safety confirmation, with only a point of attentive viewing viewed attentively by the driver as a criterion. A point of attentive viewing indicates a point when one object is viewed attentively using both eyes.

By this means, appropriate information is notified dependably with regard to a situation with which a driver is not in visual contact, and with regard to information with which the driver is determined to be in visual contact, the notification level is lowered in line with the height of the degree of recognition, and annoyance is reduced.

Patent Document 1: Japanese Patent Publication No. 2929927

DISCLOSURE OF INVENTION

Problems to be Solved by the Invention

It is generally said that, within visual information, a part that can be seen with resolution close to visual acuity measured in a visual acuity examination is in the region of two degrees around a point of attentive viewing. This high-resolution part is called central vision. Also, it is known that, with regard to an object peripheral to a central visual field (in a visual field having a range of 10 degrees to 20 degrees centered on a point of attentive viewing), it is possible to receive information instantaneously and grasp the general shape of an object. Viewing the periphery of a point of attentive viewing that is the center of such central vision (paracentral vision) is called peripheral vision here. It is thought that an important role is played not only by central vision but also by this peripheral vision when this object is recognized.

However, with a conventional traveling information providing apparatus, whether or not there is visual contact with an object is determined by the frequency of coincidence between a point of attentive viewing and a necessary direction of attentive viewing (direction of gaze), and recognition by means of a human being's peripheral visual field is not taken into consideration. There is consequently a problem in that there is a possibility of erroneous determination of non-recognition for an object that is not recognized by central vision but is recognized by peripheral vision, and a risk of that determination being received, an annoying warning being issued, and ensuring of safety in a traveling vehicle being impeded.

Also, with a conventional traveling information providing apparatus, in a case in which there are many objects requiring attentive viewing, such as when there are many pedestrians on a pedestrian crossing when turning right at an intersection, there is a possibility that an object recognized by peripheral vision will be determined to be an object for which attentive viewing frequency is low. There is thus a problem of this determination being received, numerous annoying warnings being issued, and ensuring of safety in a traveling vehicle being impeded.

It is an object of the present invention to provide a traveling information providing apparatus that ensures the safety of a traveling vehicle by accurately determining a driver's recognition of a safety confirmation object through not only the driver's attentive viewing of the safety confirmation object but also the driver's peripheral vision.

Means for Solving the Problems

A traveling information providing apparatus of the present invention employs a configuration having: a peripheral information collecting section that acquires peripheral information on the peripheral situation of a vehicle equipped with the traveling information providing apparatus; an object extracting section that extracts a safety confirmation object that is an object of safety confirmation performed by the driver of the vehicle from the peripheral information acquired by the peripheral information collecting section; a line-of-sight detecting section that detects the line-of-sight direction of the driver; a visibility calculating section that, using the detected safety confirmation object and the driver's line-of-sight direction, calculates visibility taking into consideration the driver's peripheral vision with respect to the safety confirmation object according to the distance or angle from the driver's line-of-sight direction to the object; and an evocation and control section that performs evocation of safety confirmation or control of a vehicle's driving state based on the detected visibility.

ADVANTAGEOUS EFFECT OF THE INVENTION

According to the present invention, a driver's recognition of a safety confirmation object is determined by including not only recognition of a safety confirmation object through the driver's attentive viewing but also peripheral vision, and the safety of a traveling vehicle can be ensured using this.

BRIEF DESCRIPTION OF DRAWINGS

FIG. 5 comprises conceptual diagrams of a cumulative visibility calculating method according to Embodiment 1 of the present invention;

FIG. 14 comprises drawings showing schematically processing whereby an object is classified by an object classifying section in a driving support apparatus of Embodiment 3 of the present invention;

BEST MODE FOR CARRYING OUT THE INVENTION

Embodiments of the present invention will now be described in detail with reference to the accompanying drawings. In these embodiments, a traveling information providing apparatus is described as a driving support apparatus that supports driving by providing a driver's visual contact state to the driver as traveling information.

Embodiment 1

Figure 1:
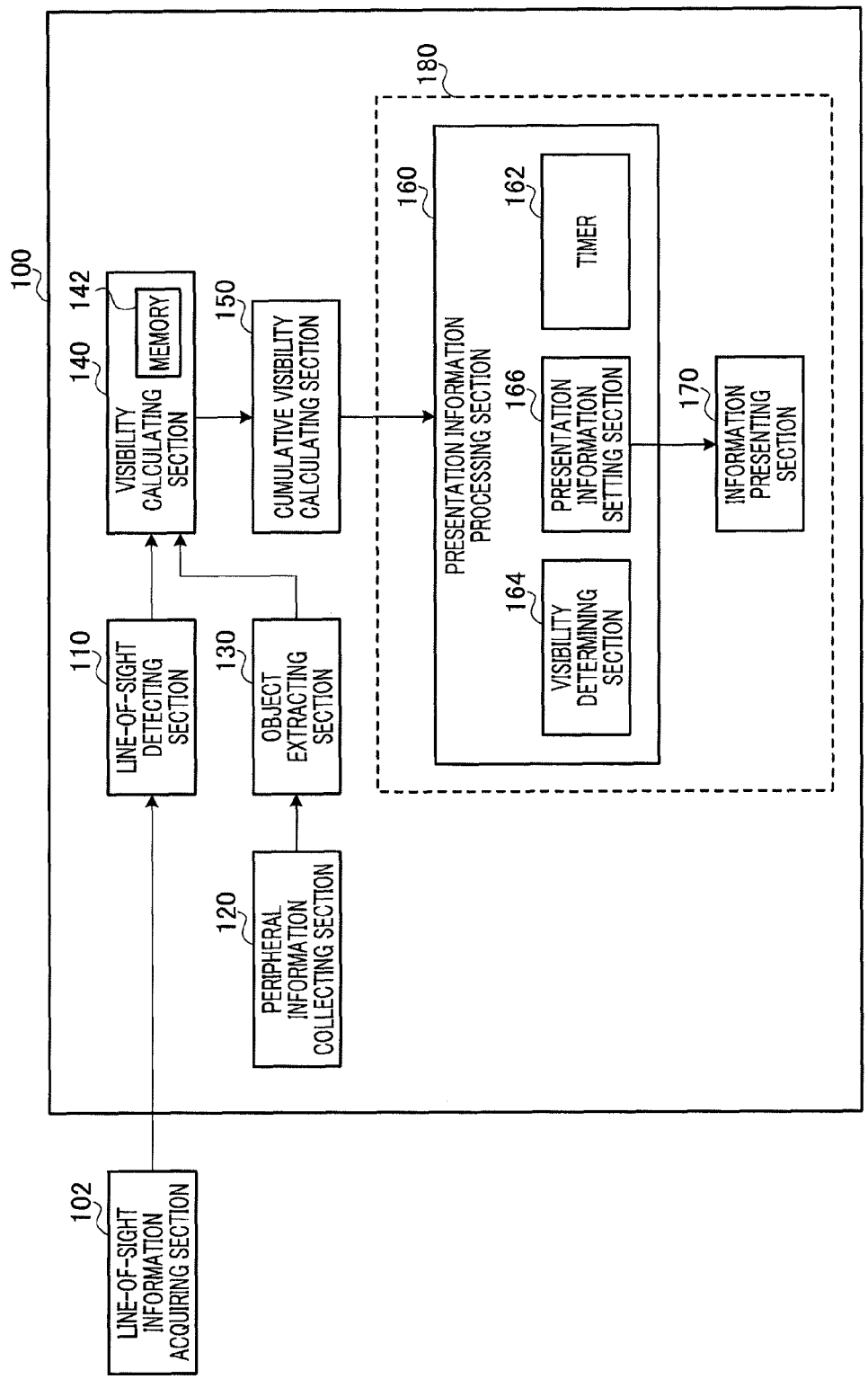
FIG. 1 is a block diagram of a driving support apparatus of Embodiment 1 of the present invention.

FIG. 1 is a block diagram showing the configuration of driving support apparatus (traveling information providing apparatus) 100 of Embodiment 1 of the present invention.

Driving support apparatus 100 shown in FIG. 1 is here installed in a vehicle, and has line-of-sight detecting section 110, peripheral information collecting section 120, object extracting section 130, visibility calculating section 140, cumulative visibility calculating section 150, presentation information processing section 160, and information presenting section 170.

Line-of-sight detecting section 110 detects a driver's line-of-sight direction (or point of attentive viewing (point of gaze, point of regard), which is a point that the driver is looking at) using driver's line-of-sight information acquired by line-of-sight information acquiring section 102, and outputs this to visibility calculating section 140.

Line-of-sight information acquiring section 102 is a section that acquires a direction in which the driver is actually looking, and is installed inside a vehicle in order to capture the driver's line-of-sight direction. An eye camera or the like that acquires a driver's eyeball image is used for this purpose. In this case, line-of-sight detecting section 110 analyzes an eyeball image captured by the eye camera, and can detect an eyeball movement and line of sight of a subject wearing the device as well as detecting a point of attentive viewing.

Line-of-sight information acquiring section 102 may also use a directional infrared sensor that acquires a driver's face direction data together with an eye camera, in which case line-of-sight detecting section 110 converts facial-plane based line-of-sight direction data from the eye camera to a directional infrared sensor facial-plane direction data coordinate system and performs combination, detects the line-of-sight direction (central vision direction) in which the driver us actually looking, and also detects the point of attentive viewing.

Peripheral information collecting section 120 is a section that collects information on the periphery of a vehicle that comprises, for example, an in-vehicle camera that captures images of the periphery of the vehicle, an ultrasonic sensor having directivity that detects the direction, distance, relative speed, and so forth, of an object present in the surroundings of the vehicle, a sensor that detects the traveling state of the vehicle, or the like, and that collects these items of information on the periphery of a vehicle as peripheral information, and outputs them to object extracting section 130. This peripheral information collecting section 120 may be configured in any way as long as it is an apparatus that collects information on the periphery of a vehicle.

Object extracting section 130 extracts an object that should be an object of safety confirmation while the vehicle is traveling—such as an oncoming vehicle or other vehicle, a pedestrian, a two-wheeled vehicle or suchlike moving object, a traffic sign or marking, a traffic signal, a pedestrian crossing, a stop sign, and suchlike traffic environment objects—from peripheral information input from peripheral information collecting section 120, and outputs this to visibility calculating section 140.

Specifically, object extracting section 130 extracts a relative distance or relative angle of a traffic environment object with respect to a central position by means of image processing or the like. The relative angle of an object is assumed to be calculated from a preset reference point such as central coordinates of the object and a reference point such as the center of the vehicle or position of the driver's seat.

Using information input from line-of-sight detecting section 110 and object extracting section 130, visibility calculating section 140 calculates visibility indicating the driver's degree of recognition for each object at a particular point in time according to a distance or angle from a line of sight or point of attentive viewing to the respective objects, and outputs this to cumulative visibility calculating section 150.

With regard to visibility calculated by visibility calculating section 140, in addition to an input line of sight and point of attentive viewing, a peripheral visual field calculated from the line of sight and point of attentive viewing is also included as a criterion for deciding visibility. A peripheral visual field is a visual field in which information reception is instantaneously possible, this being a range of approximately 10 to 20 degrees centered on the point of attentive viewing.

In other words, visibility is a degree of visibility using a visual field that includes the point of attentive viewing and a peripheral visual field that is a visual range in the vicinity of the point of attentive viewing.

Visibility calculating section 140 is provided with memory 142, and calculates visibility for an object of a line of sight and point of attentive viewing with a table showing the relationship between a point of attentive viewing and visibility stored in this memory 142, and an input line of sight and point of attentive viewing.

Figure 2:
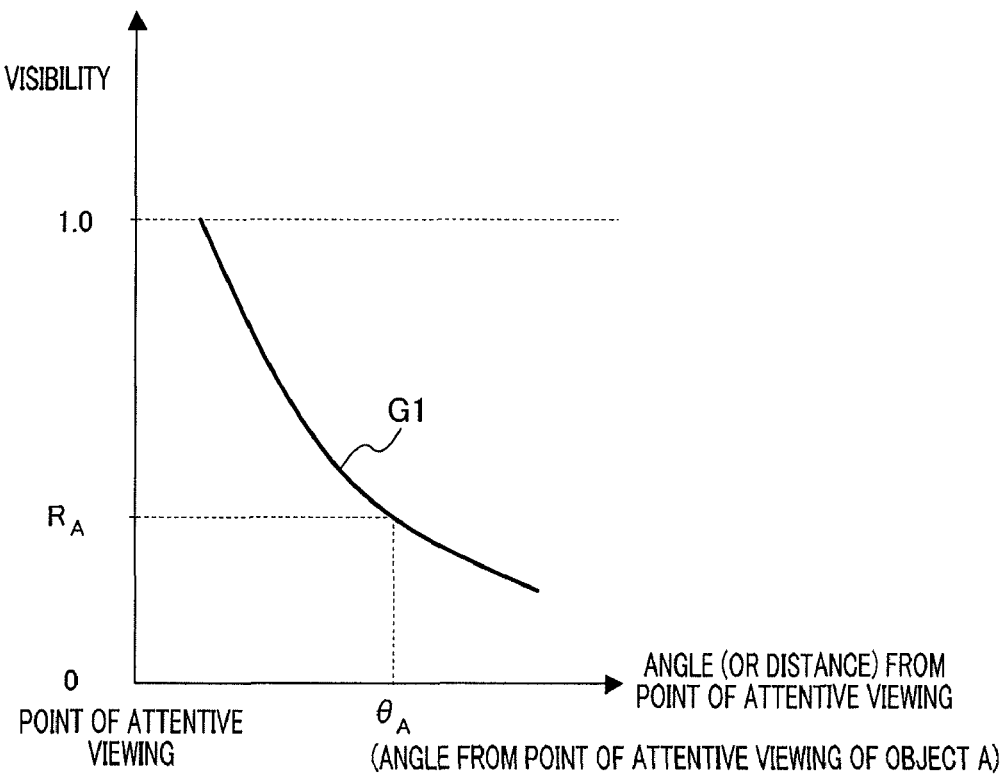
FIG. 2 is a drawing showing an example of a graph showing the relationship between an angle from a point of attentive viewing and visibility used in visibility calculation in a driving support apparatus of Embodiment 1 of the present invention.

FIG. 2 is a drawing showing an example of a graph used when calculating visibility in which a peripheral visual field has been taken into consideration in a driving support apparatus of Embodiment 1 of the present invention, and shows an example of a graph showing a relationship between an angle from a point of attentive viewing and visibility provided in memory 142 of visibility calculating section 140.

In FIG. 2, the horizontal axis represents an angle from a point of attentive viewing and the vertical axis represents the degree of visibility, and graph G1 indicates how visibility to a driver changes according to the angle from the point of attentive viewing as consecutive changes of value. This graph G1 is referred to below as visibility curve G1.

For example, when a line of sight and point of attentive viewing for object A are input, if the angle from the point of attentive viewing of object A is angle $\theta_A$, visibility calculating section 140 calculates visibility $R_A$ as the visibility of object A using visibility curve G1 in memory 142.

Figure 3:
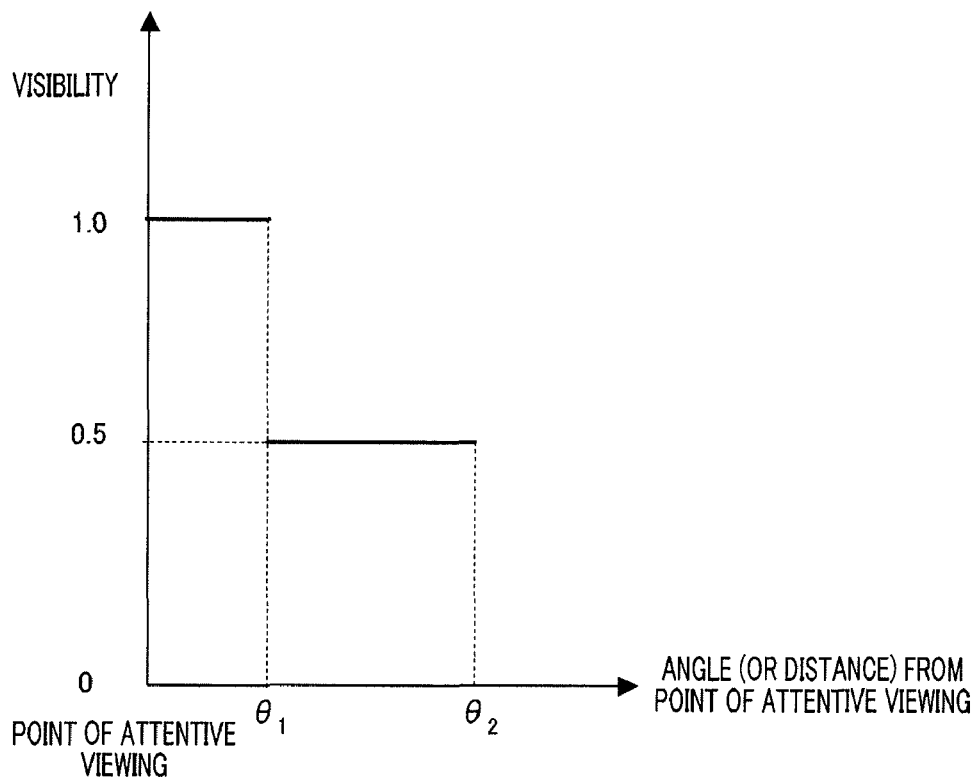
FIG. 3 is a drawing showing another example of a graph showing the relationship between an angle from a point of attentive viewing and visibility used in visibility calculation in a driving support apparatus of Embodiment 1 of the present invention.

FIG. 3 is a drawing showing another example of a graph used when calculating visibility in which a peripheral visual field has been taken into consideration in a driving support apparatus of Embodiment 1 of the present invention, and shows another example of a graph showing a relationship between an angle from a point of attentive viewing and visibility provided in memory 142 of visibility calculating section 140.

In the graph shown in FIG. 3, visibility is set for each predetermined range for an angle from a point of attentive viewing. In FIG. 3, an object for which angle $\theta$ from a point of attentive viewing satisfies the condition $\theta \leq \theta_1$ is assigned a visibility of 1.0, and when $\theta_1 < \theta < \theta_2$ a visibility is 0.5, while when $\theta \leq \theta_2$ a visibility is 0 as being outside the range of a visible visual field.

By this means, visibility in which recognition in a peripheral visual field separated from a point of attentive viewing is also taken into consideration is calculated by visibility calculating section 140.

Thus, when object information and line-of-sight information are input, visibility calculating section 140 calculates visibility to a driver for all objects at that point in time.

Cumulative visibility calculating section 150 calculates cumulative visibility by accumulating visibility input from visibility calculating section 140 on an object-by-object basis, and outputs this to presentation information processing section 160 as a per-object cumulative value.

Presentation information processing section 160 judges, changes, and sets presentation information output according to an input per-object cumulative value, and outputs presentation information to information presenting section 170.

Presentation information processing section 160 is provided with timer 162 as a clock section, and on determining that a predetermined time has elapsed using timer 162, performs setting and presentation processing of information corresponding to cumulative visibility input from cumulative visibility calculating section 150.

Also, on determining that a predetermined time has elapsed, presentation information processing section 160 determines whether or not to perform information presentation using input cumulative visibility. Specifically, presentation information processing section 160 determines whether or not timing of presentation by information presenting section 170 has been reached.

Also, presentation information processing section 160 performs determination of a driver's degree of recognition of an object of cumulative visibility (visibility determination) by means of visibility determining section 164. For example, if a preset reference value is used, the driver is judged to have recognized the relevant object of cumulative visibility if cumulative visibility is greater than or equal to the reference value (for example, 1), and is judged not to have recognized the relevant object of cumulative visibility if cumulative visibility is less than the reference value.

Also, when information presentation is performed for input cumulative visibility, presentation information processing section 160 sets or changes presentation information corresponding to that cumulative visibility by means of presentation information setting section 166, and outputs the set or changed presentation information to information presenting section 170. That is to say, presentation information processing section 160 has a function for changing a safety confirmation evocation object according to cumulative visibility calculated for each safety confirmation object in presentation information setting section 166.

Presentation information set by presentation information processing section 160 is assumed to correspond to a mode of presentation by information presenting section 170. For example, if information presenting section 170 is a display apparatus that uses a display panel or the like, presentation information is set as a display image to be displayed on that display panel, and if information presenting section 170 is a sound-producing apparatus such as a speaker, presentation information is set as speech data.

Information presenting section 170 performs presentation of information set by presentation information processing section 160, and evokes safety confirmation relating to travel of a vehicle equipped with a driving support apparatus by means of this presentation.

Here, it is assumed that information presenting section 170 is provided with a display panel (display section) installed in a vehicle, and performs display for causing the driver of the vehicle to confirm oversight of an object that is a safety confirmation object. This information presenting section 170 may also comprise a sound-producing apparatus that alerts the driver by issuing a warning sound, warning speech, or the like. Furthermore, information presenting section 170 may also be an alarm apparatus that alerts an approaching person, pedestrian, or the like to an oversight by the driver of a vehicle equipped with driving support apparatus 100.

Presentation information processing section 160 and information presenting section 170 make up evocation and control section 180 that performs evocation of safety confirmation vis-à-vis a driver or control of the driving state of a vehicle (here, the vehicle in which it is installed) based on calculated visibility or cumulative visibility. When performing vehicle driving state control, evocation and control section 180 controls, for example, the vehicle's brake, steering wheel, accelerator, and so forth, according to visibility determination performed in accordance with cumulative visibility, and thereby ensures the safety of a traveling vehicle.

When evocation and control section 180 performs vehicle driving state control, presentation information setting section 166 in presentation information processing section 160 sets or changes a vehicle driving state control object (brake, steering wheel, accelerator, or the like). Using this setting or change, evocation and control section 180 performs control of the control object. A vehicle that is a control object has here been assumed to be the vehicle equipped with driving support apparatus 100, but may also be a vehicle not equipped with driving support apparatus 100.

Figure 4:
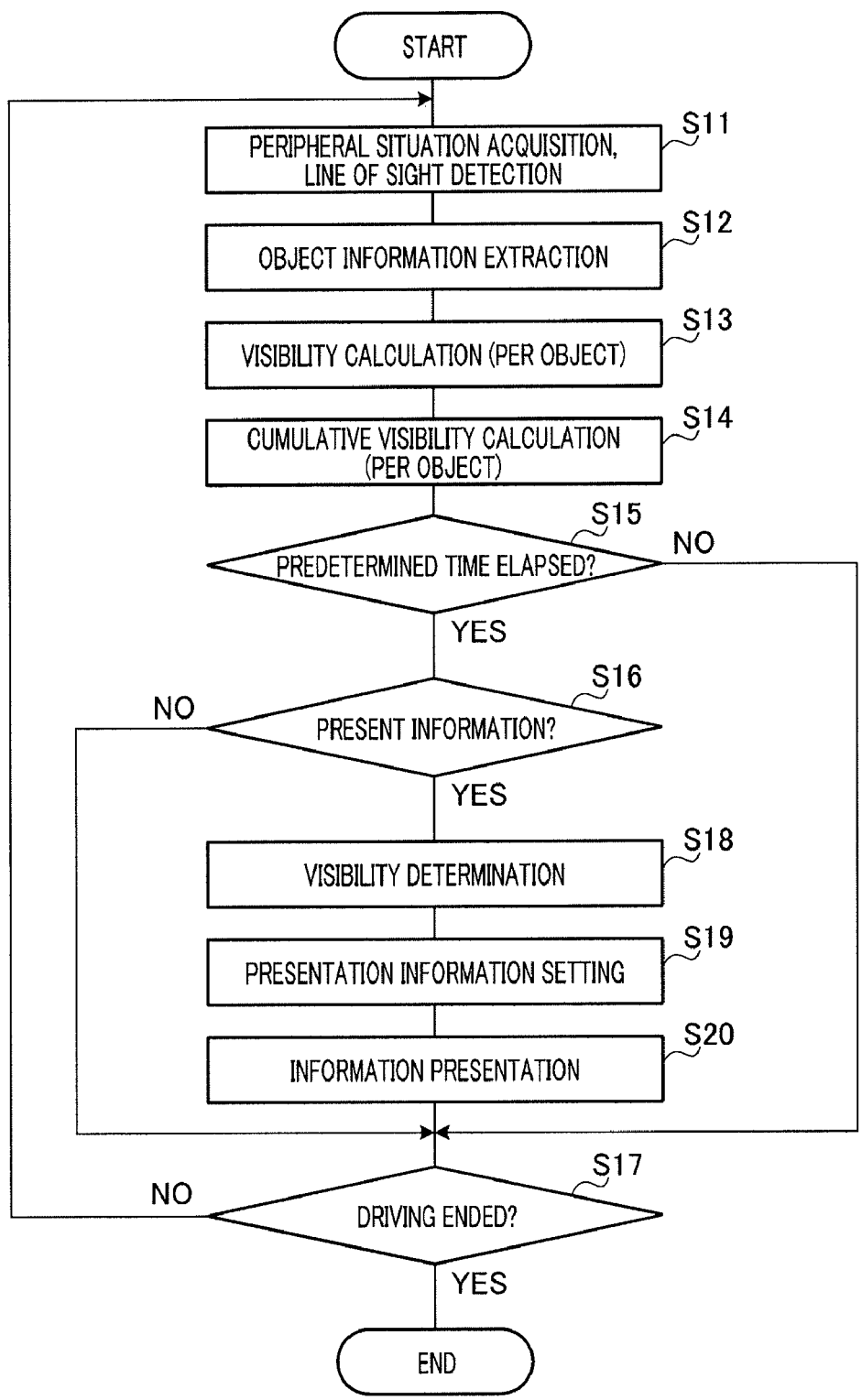
FIG. 4 is a flowchart showing the operation of a driving support apparatus of Embodiment 1 of the present invention.

Next, the operation of a driving support apparatus of Embodiment 1 of the present invention will be described using FIG. 4. FIG. 4 is a flowchart showing the operation of a driving support apparatus of Embodiment 1 of the present invention.

As shown in FIG. 4, in step S11 peripheral information collecting section 120 in a vehicle equipped with driving support apparatus 100 collects peripheral video (peripheral information) on the periphery (peripheral situation) of the traveling vehicle by means of a camera or the like, and line-of-sight detecting section 110 performs driver's line-of-sight direction (and point of attentive viewing) detection using driver's line-of-sight information acquired by line-of-sight information acquiring section 102, and proceeds to step S12. The peripheral situation acquisition and line-of-sight direction detection are performed at approximately the same timing.

In step S12, object extracting section 130 extracts a relative distance and relative angle with respect to the central position of a traffic environment object or the like such as another vehicle, a pedestrian, a two-wheeled vehicle or suchlike moving object, a traffic sign or marking, a traffic signal, a pedestrian crossing, or a stop sign, from acquired peripheral information (peripheral video) by means of image processing or the like, and proceeds to step S13.

In step S13, when object information and line-of-sight information are input, visibility calculating section 140 calculates visibility to the driver for all objects at that point in time, and proceeds to step S14.

To be specific, in step S13 visibility calculating section 140 calculates per-object visibility at a particular point in time from the angular difference of the line of sight and object from an input line-of-sight direction angle and a relative angle of each object with respect to the vehicle (or distance in an image from a point of attentive viewing).

In step S14, cumulative visibility calculating section 150 calculates per-object cumulative visibility by accumulating input per-object visibility at a point in time for each identical object for a predetermined period, and proceeds to step S15.

In step S15, presentation information processing section 160 determines whether or not a predetermined time has elapsed, proceeds to step S16 if the predetermined time has elapsed, or proceeds to step S17 if the predetermined time has not elapsed and returns to step S11 if vehicle driving has ended. The predetermined time used in the determination in step S15 is a preset time for accumulating calculated visibility.

Determination of the end of vehicle driving in step S17 is performed based on whether or not the engine of the vehicle has stopped, for example, and processing is terminated if the engine has stopped.

Thus, visibility calculating section 140 and cumulative visibility calculating section 150 continue visibility calculation and cumulative visibility calculation for a predetermined time until it is determined by presentation information processing section 160 that a predetermined time has elapsed.

A description will be given here of visibility calculation processing by visibility calculating section 140 and cumulative visibility calculation processing by cumulative visibility calculating section 150 until it is determined that a predetermined time has elapsed—that is, until the elapse of a predetermined time.

FIG. 5 comprises drawings showing schematically changes in a point of attentive viewing during driving, these being drawings showing examples of a scene viewed by a driver together with visibility and cumulative visibility according to changes in the point of attentive viewing during driving.

Here, for convenience, it is assumed that visibility used when calculating cumulative visibility is calculated by visibility calculating section 140 using the visibility curve shown in FIG. 3. That is to say, as shown in FIG. 3, for an object for which angle θ from a point of attentive viewing satisfies the condition $\theta \leq \theta_1$, visibility is 1.0, visibility is 0.5 when $\theta_1 \leq \theta \leq \theta_2$, and visibility is 0 when $\theta \leq \theta_2$.

The scenes shown in order in FIG. 5A, FIG. 5C, FIG. 5E, and FIG. 5G are examples of scenes viewed by the driver of a vehicle entering intersection 31 during a predetermined period—that is, examples of changes in the point of attentive viewing during a predetermined period. In FIG. 5, the driver's point of attentive viewing is designated 21, a range that satisfies the condition $\theta \leq \theta_1$ is designated central visual field 22, a range that satisfies the condition $\theta_1 < \theta < \theta_2$ is designated peripheral visual field 23, visibility of the central visual field is 1.0, and visibility of the peripheral visual field is 0.5.

In scene 1 shown in FIG. 5A, the visibility of oncoming vehicle (object) 32 is calculated as 0.5, and the visibility of pedestrian (object) 33 as 0, by visibility calculating section 140, and the cumulative visibilities of the objects whose visibility was calculated are calculated by cumulative visibility calculating section 150.

The visibilities and cumulative visibilities calculated in this FIG. 5A are stored in memory 142 as calculated oncoming vehicle 32 visibility 0.5 and pedestrian 33 visibility 0.0 as shown in FIG. 5B. Since visibilities of the respective objects have not yet been accumulated at this time, the cumulative visibilities of the oncoming vehicle and pedestrian at this time are 0.5 for the oncoming vehicle and 0.0 for the pedestrian.

Following this, there is a change from the state shown in FIG. 5A to the state shown in FIG. 5C. Here, point of attentive viewing 21 overlaps oncoming vehicle 32, and the driver is attentively viewing oncoming vehicle 32. Then, along with this, the visibility of oncoming vehicle 32 is input to cumulative visibility calculating section 150, and respective cumulative visibilities are calculated by addition to the visibility of the same object for each object in the previous state (the state in FIG. 5A) In the state in FIG. 5C, visibility calculating section 140 calculates an oncoming vehicle 32 visibility of 1.0 and pedestrian 33 visibility of 0.0, and cumulative visibility calculating section 150 calculates an oncoming vehicle 32 visibility of 1.5 and pedestrian 33 visibility of 0.0 by accumulating visibility on an object-by-object basis, as shown in FIG. 5D.

Next, point of attentive viewing 21 changes from the state shown in FIG. 5C to the state shown in FIG. 5E. In FIG. 5E, point of attentive viewing 21 is not on either oncoming vehicle 32 or pedestrian 33 taken as objects in this example, and is not on the periphery either.

Thus, in the state in FIG. 5E, visibility calculating section 140 calculates an oncoming vehicle 32 visibility of 0.0 and pedestrian 33 visibility of 0.0, and cumulative visibility calculating section 150 calculates an oncoming vehicle 32 visibility of 1.5 and pedestrian 33 visibility of 0.0 by accumulating visibility on an object-by-object basis, as shown in FIG. 5F. That is to say, since visibility has not been calculated here for either oncoming vehicle 32 or pedestrian 33, the numeric values are the same as for the cumulative visibilities shown in FIG. 5D (oncoming vehicle 32 cumulative visibility of 1.5 and pedestrian 33 cumulative visibility of 0.0).

Following this, there is a change from the state shown in FIG. 5E to the state shown in FIG. 5G. Here, since point of attentive viewing 21 is located in the vicinity of pedestrian 33, and pedestrian 33 is within peripheral visual field 23, visibility calculating section 140 calculates an oncoming vehicle 32 visibility of 0.0 and pedestrian 33 visibility of 0.5 (see FIG. 5H), and cumulative visibility calculating section 150 calculates cumulative visibilities by addition to the visibility of the same object for each object in the previous (FIG. 5F) state. As shown in FIG. 5H, cumulative visibility calculating section 150 calculates an oncoming vehicle 32 visibility of 1.5 and pedestrian 33 visibility of 0.5 by accumulating visibility on an object-by-object basis—that is, accumulating the oncoming vehicle visibility 0.0 and the pedestrian visibility 0.5 to previous cumulative visibilities 1.5 and 0.0.

In step S16, presentation information processing section 160 determines whether or not to perform presentation of information in accordance with cumulative visibility input when it was determined that a predetermined time had elapsed, and proceeds to step S17 if information presentation is not performed, or to step S11 if information presentation is performed. If the processing flow proceeds to step S17 and vehicle driving has not ended, the processing flow returns to step S11 and processing is repeated up to cumulative visibility calculation processing. The determination in this step S16 means whether or not this is timing at which a degree of visibility to the driver is presented by information presenting section 170.

In step S18, presentation information processing section 160 determines the degree of visibility to (recognition by) the driver of a cumulative visibility object, and proceeds to step S19.

In step S19, presentation information processing section 160 sets presentation information according to cumulative visibility that reflects the degree of recognition of an object, and proceeds to step S20.

In step S20, information presenting section 170 presents presentation information set by presentation information processing section 160 to the driver, and proceeds to step S17.

In this embodiment, it is assumed that information is provided to the driver of a vehicle using a display panel as information presenting section 170, and that presentation information is set and displayed on the display panel by presentation information processing section 160 according to per-object cumulative visibility. Here, it is assumed that presentation information is displayed on the display panel with a color superimposed on an object of safety confirmation, and indicates the degree of recognition of that object. On receiving this, information presenting section 170 changes a presentation color for presentation information indicating a degree of visibility displayed on the display panel according to cumulative visibility.

Figure 6:
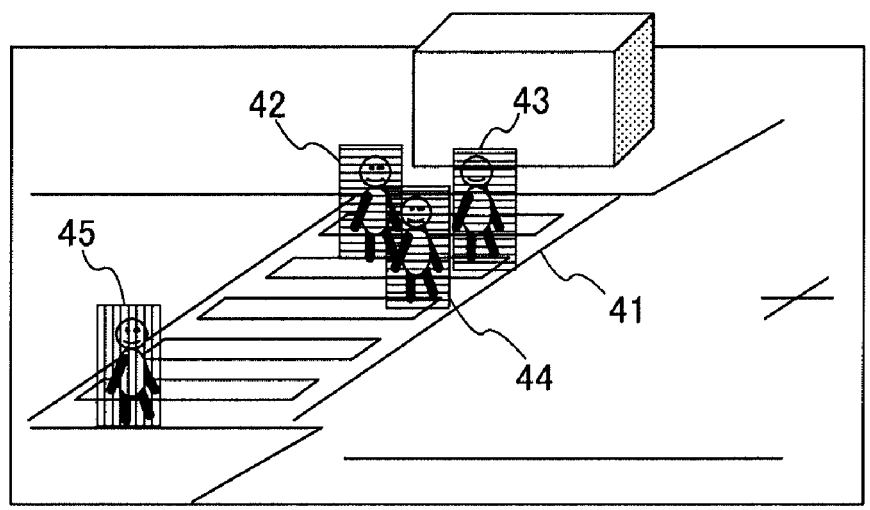
FIG. 6 is a drawing showing an example of information presentation performed by an information presenting section in a driving support apparatus of Embodiment 1 of the present invention.
Figure 7:
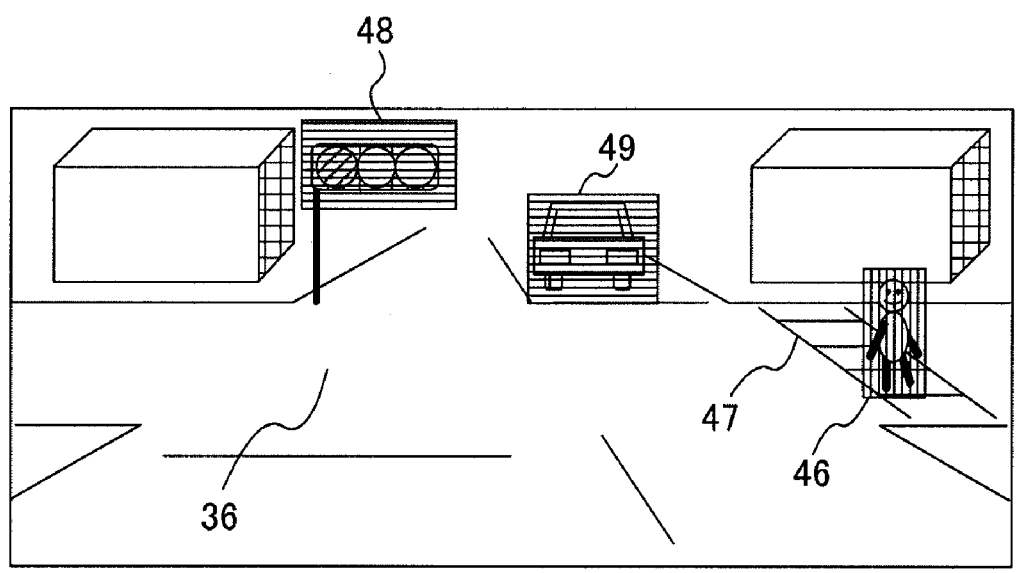
FIG. 7 is a drawing showing an example of information presentation performed by an information presenting section in a driving support apparatus of Embodiment 1 of the present invention.

FIG. 6 and FIG. 7 are drawings showing examples of information presentation performed by information presenting section 170 in a driving support apparatus of Embodiment 1 of the present invention.

It is assumed that presentation information shown in FIG. 6 and FIG. 7 is set in different colors for driver recognition and non-recognition of an object of information presentation. Here, recognition or non-recognition of an object is determined by whether or not per-object cumulative visibility exceeds a predetermined reference value in presentation information processing section 160. That is to say, in presentation information processing section 160, it is determined that the driver recognizes an object if cumulative visibility exceeds a predetermined reference value, and it is determined that the driver does not recognize an object if cumulative visibility does not exceed a predetermined reference value.

As shown in FIG. 6, information presenting section 170 judges that the driver recognizes pedestrians (objects) 42 through 44 on pedestrian crossing 41, and highlights the objects in a color evoking little attention, such as light blue. Actually, information presentation need not be performed for such an object for which cumulative visibility exceeds a predetermined reference value and that is judged to be recognized by the driver. In FIG. 6, information presenting section 170 highlights pedestrian (object) 45 for which cumulative visibility does not meet a predetermined reference value in a color that tends to draw attention, such as red.

By this means, driving support apparatus 100 can provide stronger highlighting of an object with lower visibility to a driver, causing the driver to make visual contact, and prompting the driver to execute safety confirmation.

Also, if, in presentation information processing section 160, a numeric value of cumulative visibility is regarded directly as a degree of visibility to the driver, and a visibility reference value is not provided, display may be performed by means of lightness or darkness of color according to visibility. In FIG. 7, traffic signal (object) 48 and oncoming vehicle (object) 49 at pedestrian crossing 36 have high cumulative visibility, and are therefore displayed in blue by information presenting section 170, while pedestrian (object) 46 crossing pedestrian crossing 47 has low cumulative visibility and is therefore highlighted by information presenting section 170.

During driving, processing shown in the flowchart from peripheral situation acquisition to information presentation is executed sequentially at arbitrary timing.

According to this embodiment, determination of whether or not a driver of a traveling vehicle recognizes an object for which safety confirmation is necessary is performed based on a visual field including a peripheral visual field in a range peripheral to the driver's point of attentive viewing in addition to a central visual field that includes the driver's point of attentive viewing. By this means, determination of recognition or non-recognition of an object viewed by the driver can be performed accurately.

If an object for which safety confirmation is necessary is not recognized, information to that effect is presented to the driver, whereby the driver is prompted to execute safety confirmation with respect to an object he or she has overlooked, enabling confirmation to be performed for that object, and enabling a collision with a pedestrian or the like while the vehicle is traveling to be prevented and vehicle safety to be improved.

Embodiment 2

Figure 8:
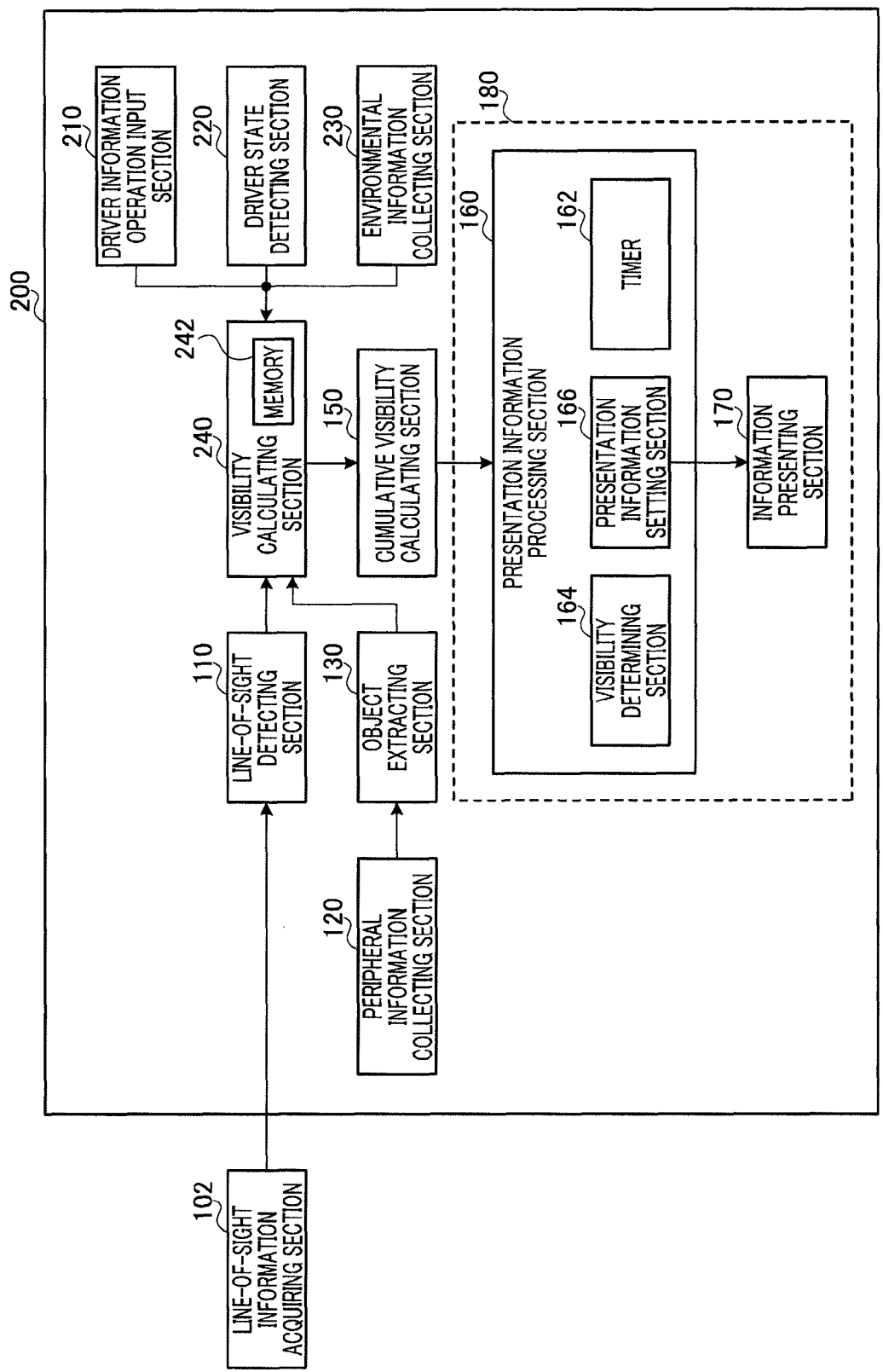
FIG. 8 is a block diagram of a driving support apparatus of Embodiment 2 of the present invention.

FIG. 8 is a block diagram of driving support apparatus 200 of Embodiment 2 of the present invention. Driving support apparatus 200 of Embodiment 2 has a similar basic configuration to that of driving support apparatus 100 corresponding to Embodiment 1 shown in FIG. 1, and therefore identical configuration elements are assigned the same reference codes, and descriptions thereof are omitted here.

This driving support apparatus 200 differs from driving support apparatus 100 in regard to visibility calculated by visibility calculating section 240, with an element that differs on a driver-by-driver basis being taken into consideration in visibility calculated by driving support apparatus 200.

That is to say, in driving support apparatus 200, factors influencing a driver's vision characteristics are taken into consideration in calculating visibility calculated for an object.

Factors influencing a driver's vision characteristics comprise static driver attribute information such as a driver's age, and it is possible, for example, that the range of visibility centered on a driver's point of attentive viewing—here, the driver's peripheral visual field—may be narrower the higher the driver's age.

Similarly, factors influencing a driver's vision characteristics may include a driver's level of alertness, the number of objects to which attention should be paid around the vehicle, the weather, brightness, and so forth.

Specifically, previous research has demonstrated that when a driver is driving while alert, the driver's line of sight moves in a wide range ahead of the vehicle, whereas when a driver is driving with a reduced level of alertness, as in the case of inattentive driving, the range of movement of the driver's line of sight is concentrated toward a central area (Reference Document: "Detection System of Gaze Direction for Excessive Concentration through Cellular Phone Use and Inattention" Shinji Mita, 2002 ITS World Congress paper). Thus, it is possible to estimate a level of alertness from line-of-sight movement, and calculate visibility corresponding to a driver's state by changing visibility according to the level of alertness.

Also, previous research has demonstrated that when there are many objects to which attention should be paid around a traveling vehicle, the peripheral vision range narrows (Reference Document: "Drivers' Visual Attention Characteristics" Automotive Technology, Vol. 58, No. 12, 2004). Thus, it is possible to calculate visibility corresponding to environmental information by changing visibility according to the number of objects around a vehicle. Furthermore, visibility may also be changed by taking into consideration environmental information such as the level of congestion, weather, brightness, and so forth, that may possibly influence a driver's vision characteristics.

Thus, it is possible to calculate visibility corresponding to a driver's state and environmental information by changing visibility according to the level of alertness of the driver and the traffic environment, including the number of vehicles around the driver's vehicle, the level of congestion, weather, brightness, and so forth.

In FIG. 8, driving support apparatus 200 has driver information operation input section 210, driver state detecting section 220, and environmental information collecting section 230, in addition to the configuration elements in FIG. 1.

Driver information operation input section 210 is a section to which driver attribute information that is static information relating to a driver—such as the driver's age, sex, driving history, and violation history—is input by means of an operation, and that outputs input driver attribute information to visibility calculating section 240. These items of static driver attribute information are parameters that set or change a driver's visual field characteristics.

Driver state detecting section 220 is a section that detects a driver's static attribute information that influences a driver's visual field characteristics. Driver state detecting section 220 detects, for example, a driver's level of alertness as static attribute information, and outputs this to visibility calculating section 240. Specifically, driver state detecting section 220 may be a device that detects a driver's line-of-sight movement, such as an eye camera. This static driver attribute information is a parameter that sets or changes a driver's visual field characteristics.

Environmental information collecting section 230 collects and acquires information on environment influencing a driver's visual field characteristics other than a driver's static or dynamic attributes—for example, the number of vehicles around the driver's vehicle, the level of congestion, weather, brightness, and so forth—and outputs this information to visibility calculating section 240. This environmental information collecting section 230 may be configured so as to receive input of various kinds of information via radio communication, or may be configured so as to collect information using a camera that captures the environmental situation around the vehicle. These elements of the environmental situation around the vehicle being driven by the driver are parameters that set or change visual field characteristics while driving.

In the same way as visibility calculating section 140 shown in FIG. 1, visibility calculating section 240 has information on a driver's line of sight and point of attentive viewing as input from line-of-sight detecting section 110, and has object information necessary for safety confirmation as input from object extracting section 130.

Also input to visibility calculating section 240 is dynamic driver information such as driver attribute information, the driver's level of alertness, and traffic environment information such as the number of vehicles around the driver's vehicle, the level of congestion, weather, brightness, and so forth.

Using these input items of information, visibility calculating section 240 calculates visibility indicating the driver's degree of recognition for each object at a particular point in time according to a distance or angle from the driver's line of sight or point of attentive viewing to the respective objects, and outputs this to cumulative visibility calculating section 150.

In other words, visibility calculating section 240 calculates per-object visibility using driver information, the driver's state, and the traffic environment, in addition to a line-of-sight direction angle and relative angle with respect to the object vehicle, and outputs this to cumulative visibility calculating section 150.

With regard to visibility calculated by visibility calculating section 240, as in Embodiment 1, in addition to an input line of sight and point of attentive viewing, a peripheral visual field calculated from the line of sight and point of attentive viewing is also included as a criterion for deciding visibility. As stated above, a peripheral visual field is a visual field in which information reception is instantaneously possible, this being a range of approximately 10 to 20 degrees centered on the point of attentive viewing.

Specifically, visibility calculating section 240 is provided with memory 242, and calculates visibility for an object of a line of sight and point of attentive viewing with a table showing the relationship between a point of attentive viewing and visibility stored in this memory 242, and an input line of sight and point of attentive viewing.

The table stored in memory 242 by visibility calculating section 240 enables visibility to be changed based on information input from driver information operation input section 210, driver state detecting section 220, and environmental information collecting section 230. As an example of this, processing that changes and sets visibility according to age will be described using FIG. 9.

Figure 9:
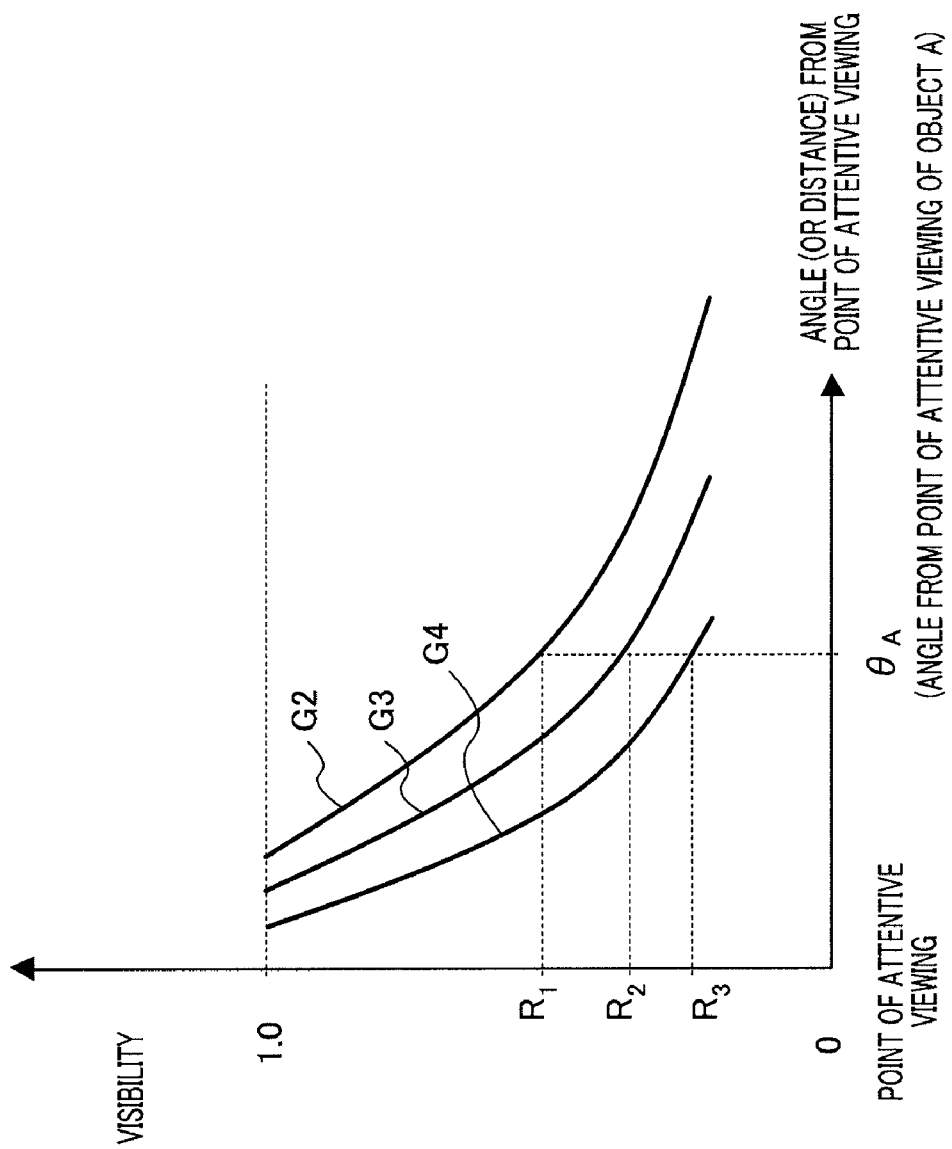
FIG. 9 is a drawing showing an example of a graph used when calculating visibility in which a peripheral visual field has been taken into consideration in a driving support apparatus of Embodiment 2 of the present invention.

FIG. 9 is a drawing showing an example of a graph used when calculating visibility in which a peripheral visual field has been taken into consideration in driving support apparatus 200 of Embodiment 2 of the present invention. FIG. 9 is a drawing showing graphs (visibility curves) G2 through G4 according to driver age provided in memory 242 by visibility calculating section 240, and shows an example of a graph showing a relationship between an angle from a point of attentive viewing and visibility. In FIG. 9, 0 represents a point of attentive viewing, the horizontal axis represents an angle from point of attentive viewing 0, and the vertical axis represents visibility, and graphs (visibility curves) G2 through G4 show how visibility to a driver changes according to the respective angles from the point of attentive viewing.

In FIG. 9, visibility curve G2 is defined as a visibility curve of a driver in his or her twenties, visibility curve G3 is defined as a visibility curve of a driver in his or her forties, and visibility curve G4 is defined as a visibility curve of a driver in his or her sixties. When age-based visibility curves G2 through G4 are used in this way, at angle $\theta_A$ from the point of attentive viewing of object A, visibility of object A is calculated as $R_2$ if a driver's age is 40 years. Similarly, at angle $\theta_A$ from the point of attentive viewing of object A, visibility of object A is calculated as $R_1$ if a driver's age is 20 years, and the calculated visibility is higher than for an age of 40 years under the same conditions.

In this way, visibility calculating section 240 performs visibility calculation taking visibility characteristics of an object according to age into consideration. By this means, visibility to a driver can be calculated accurately, taking appropriate account of the driver actually driving and the driver's state.

Similarly, when a driver's level of alertness is taken into consideration as dynamic attribute information when using the graph in FIG. 9, a visibility curve with a steeper gradient is used when the level of alertness is normal than when the level of alertness is low.

For example, a configuration is used whereby, when using the graph in FIG. 9, even when static attribute information on age indicating that the driver is in his or her twenties is input, visibility calculating section 240 calculates visibility using visibility curve G3 or G4 having a steeper gradient than visibility curve G2 according to a low level of alertness rather than using visibility curve G2.

Similarly, also, when information on the need to pay attention around the vehicle is input from environmental information collecting section 230, if, for example, traffic environment information is input that shows the number of vehicles around the driver's vehicle is high, congestion is moderate, and the weather is cloudy or rainy and the surroundings are darker than a predetermined brightness (daytime), a visibility curve having a steeper gradient than a normally used visibility curve may be used, for instance.

Specifically, if the number of vehicles around the driver's vehicle representing a number of objects requiring attention to be paid in the surroundings of the driver's vehicle is ten or more or five or more, a configuration is used whereby, when applying FIG. 9, even when static attribute information indicating that the driver is in his or her twenties is input, visibility calculating section 240 calculates visibility using visibility curve G3 or G4 having a steeper gradient than visibility curve G2 rather than using visibility curve G2.

Next, the operation of driving support apparatus 200 will be described using FIG. 10.

Figure 10:
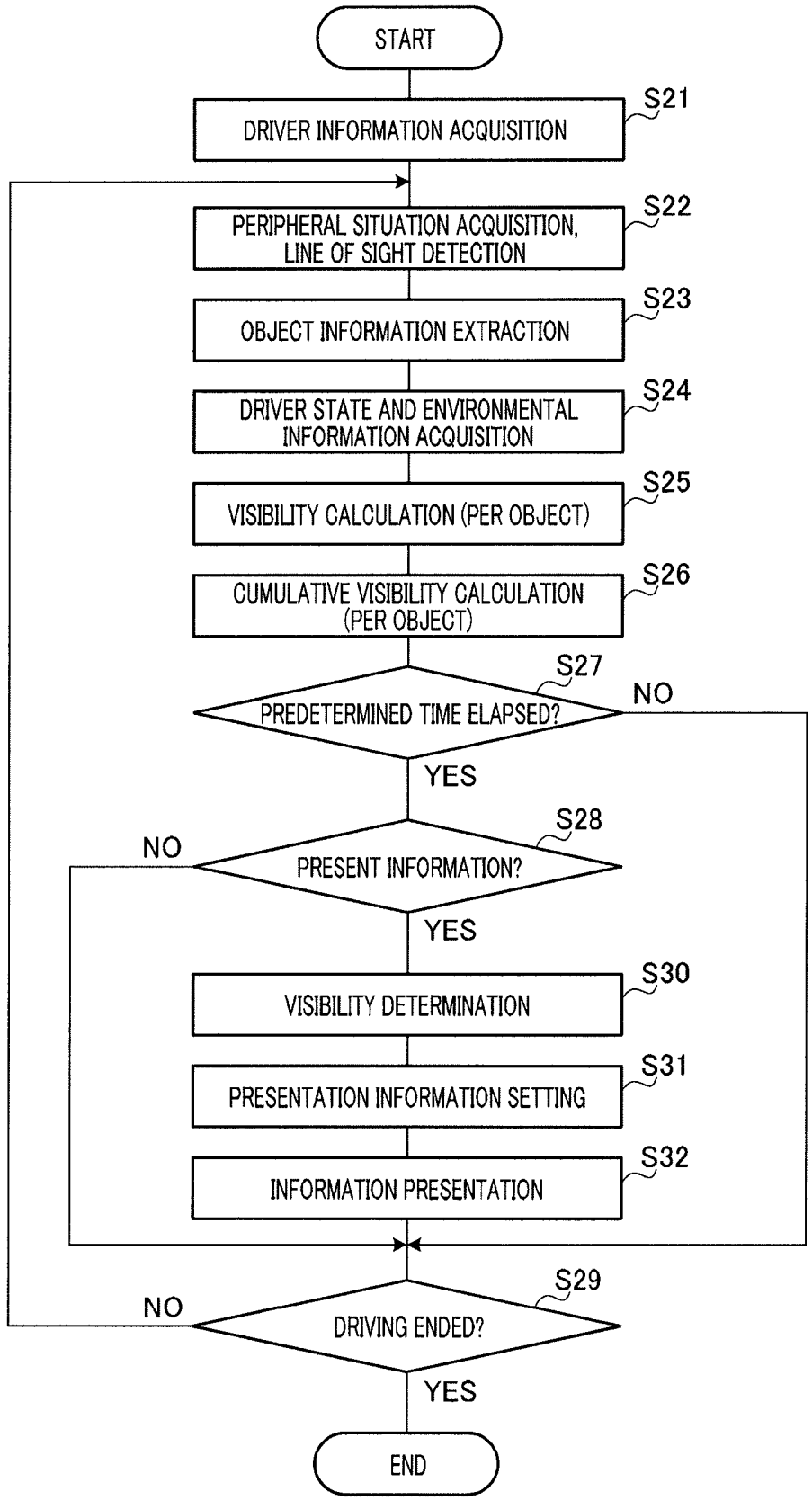
FIG. 10 is a flowchart showing the operation of a driving support apparatus of Embodiment 2 of the present invention.

FIG. 10 is a flowchart showing the operation of a driving support apparatus of Embodiment 2 of the present invention.

As shown in FIG. 10, first, in step S21, driver information operation input section 210 in a vehicle equipped with driving support apparatus 200 has as input driver information that is driver attribute information comprising static driver information such as the driver's age, sex, driving history, and violation history, by means of a driver operation when the driver starts driving or takes the driver's seat, acquires these items of driver attribute information, and proceeds to step S22.

In step S22, peripheral information collecting section 120 collects peripheral video (peripheral information) as information on the periphery of the traveling vehicle by means of a camera or the like, and line-of-sight detecting section 110 performs driver's line-of-sight direction (and point of attentive viewing) detection using driver's line-of-sight information acquired by line-of-sight information acquiring section 102, and proceeds to step S23. The peripheral situation acquisition and line-of-sight direction detection are performed at approximately the same timing.

In step S23, object extracting section 130 extracts a relative distance and relative angle with respect to the central position of a traffic environment object or the like such as another vehicle, a pedestrian, a two-wheeled vehicle or suchlike moving object, a traffic sign or marking, a traffic signal, a pedestrian crossing, or a stop sign, from acquired peripheral information (peripheral video) by means of image processing or the like, and proceeds to step S24.

In step S24, driver state detecting section 220 acquires the driver's state (here, the driver's level of alertness), environmental information collecting section 230 acquires traffic environment information such as the number of vehicles around the driver's vehicle, the level of congestion, weather, brightness, and so forth, and the processing flow proceeds to step S25.

In step S25, when object information, line-of-sight information, driver state (level of alertness) information, and traffic environment information are input, visibility calculating section 240 calculates visibility to the driver for all objects at that point in time, and proceeds to step S26.

To be specific, in step S25 visibility calculating section 240 calculates per-object visibility at a particular point in time from the angular difference of an object from the line of sight (or distance in an image from the point of attentive viewing) using driver information, the driver's state, and the traffic environment, in addition to an input line-of-sight direction angle and a relative angle of an object with respect to the object vehicle.

In step S26, cumulative visibility calculating section 150 calculates per-object cumulative visibility by accumulating input per-object visibility at a point in time for each identical object for a predetermined period, and proceeds to step S27.

In step S27, presentation information processing section 160 determines whether or not a predetermined time has elapsed, and proceeds to step S28 if the predetermined time has elapsed, or proceeds to step S29 if the predetermined time has not elapsed. If vehicle driving has ended in step S29, the processing flow returns to step S22. The predetermined time used in the determination in step S27 is a preset time for accumulating calculated visibility.

That is to say, visibility calculating section 240 and cumulative visibility calculating section 150 continue visibility calculation and cumulative visibility calculation for a predetermined time until it is determined by presentation information processing section 160 that a predetermined time has elapsed. The processing by visibility calculating section 240 and cumulative visibility calculating section 150 up to determination that a predetermined time has elapsed—that is, until the elapse of a predetermined time—is the same as visibility calculation processing by visibility calculating section 140 and cumulative visibility calculation processing by cumulative visibility calculating section 150 described above, and therefore a description thereof is omitted here.

In step S28, after it is determined that a predetermined time has elapsed, presentation information processing section 160 determines whether or not to perform presentation of information in accordance with the input cumulative visibility (cumulative value) of each object for which safety confirmation should be performed.

In step S28, the processing flow proceeds to step S29 if information presentation is not performed, or to step S30 if information presentation is performed. If the processing flow proceeds to step S29 and vehicle driving has not ended, driving support apparatus 200 returns to step S22 and repeats the processing up to cumulative visibility calculation processing.

In step S30, presentation information processing section 160 determines the degree of visibility to (recognition by) the driver of a cumulative visibility object.

In this step S30, using a preset reference value, for example, presentation information processing section 160 judges that a driver recognizes (is in visual contact with) a cumulative visibility object if the cumulative visibility of that object is greater than or equal to a reference value (for example, 1), and judges that a driver does not recognize (is not in visual contact with) a cumulative visibility object if the cumulative visibility of that object is less than that reference value. After this kind of determination of visibility to the driver, the processing flow proceeds to step S31.

In step S31, presentation information processing section 160 sets presentation information according to cumulative visibility that reflects the degree of recognition of an object, and proceeds to step S32.

In step S32, information presenting section 170 presents presentation information set by presentation information processing section 160 to the driver, and proceeds to step S29. During driving, processing from peripheral situation acquisition to information presentation is executed sequentially at arbitrary timing.

Driving support apparatus 200 calculates visibility for an object taking into consideration factors influencing a driver's vision characteristics, such as static driver attribute information, the driver's level of alertness, which is driver state information (dynamic driver attribute information), traffic environment (peripheral environment) information, and so forth.

By this means, information provided to the driver such as oversight of an object for which safety confirmation by the driver is necessary is presented more accurately by also taking the driver's actual driving state into consideration, and safety confirmation can be evoked.

Sample Variant of Embodiment 2

Figure 17:
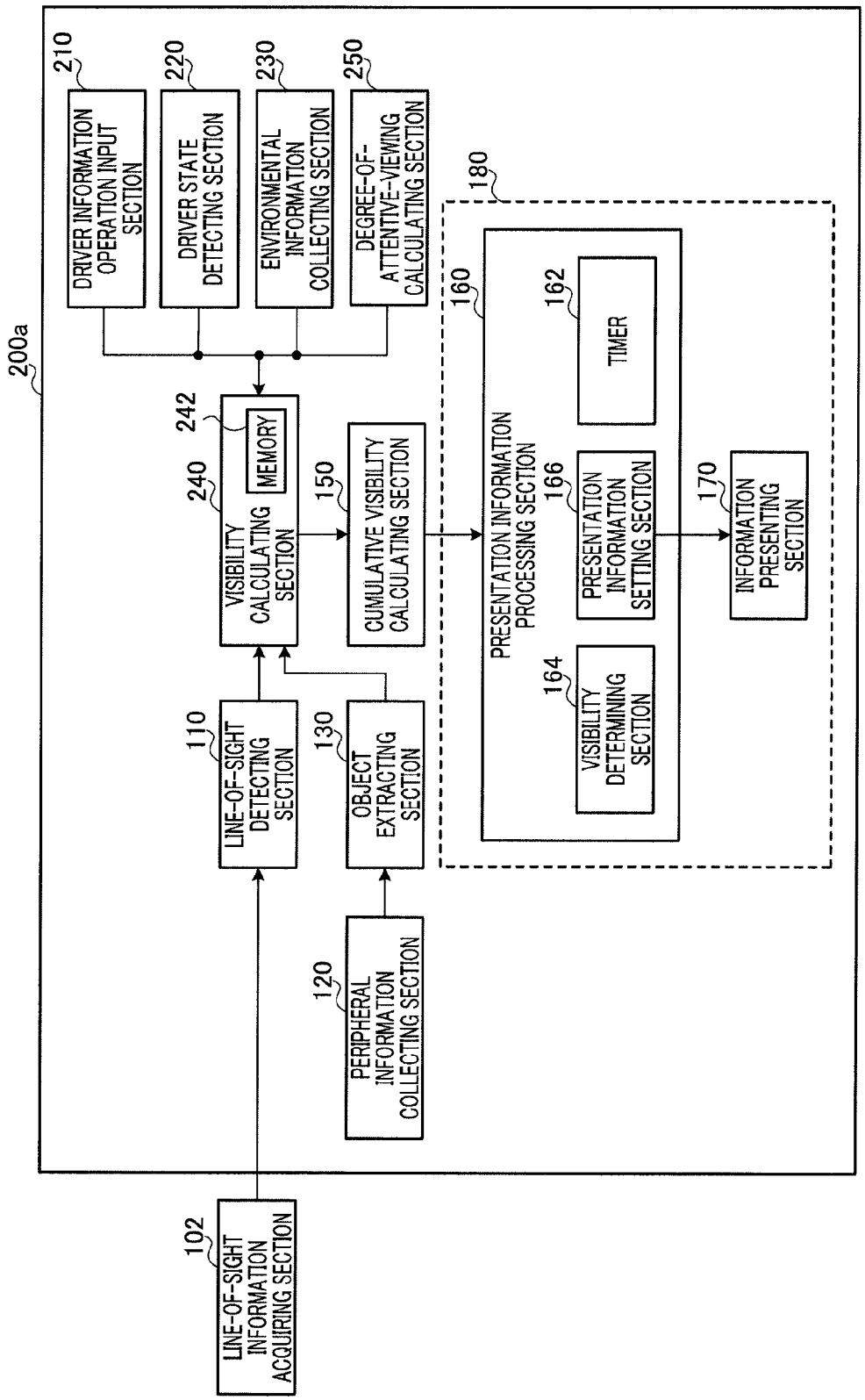
FIG. 17 is a block diagram showing a sample variant of a driving support apparatus of Embodiment 2 of the present invention.

FIG. 17 is a block diagram showing sample variant driving support apparatus 200a of Embodiment 2 of the present invention. In this driving support apparatus 200a of Embodiment 2, degree-of-attentive-viewing calculating section 250 has been added to the configuration of driving support apparatus 200 of Embodiment 2 shown in FIG. 8. Other configuration elements of driving support apparatus 200a are the same as those of driving support apparatus 200, and have the same functions. Therefore, identical configuration elements are assigned the same reference codes, and descriptions thereof are omitted here.

This driving support apparatus 200a differs from driving support apparatus 100 in regard to visibility calculated by visibility calculating section 240, with an element that differs on a driver-by-driver basis being taken into consideration in visibility calculated by driving support apparatus 200a.

That is to say, in driving support apparatus 200a, factors influencing a driver's vision characteristics are taken into consideration in calculating visibility calculated for an object.

Factors influencing a driver's vision characteristics comprise static driver attribute information such as a driver's age, and it is possible, for example, that the range of visibility centered on a driver's point of attentive viewing—here, the driver's peripheral visual field—may be narrower the higher the driver's age.

Similarly, factors influencing a driver's vision characteristics may include a driver's level of alertness and degree of attentive viewing with respect to an object, the number of objects to which attention should be paid around the vehicle, the weather, brightness, and so forth.

Specifically, previous research has demonstrated that when a driver is driving while alert, the driver's line of sight moves in a wide range ahead of the vehicle, whereas when a driver is driving with a reduced level of alertness, as in the case of inattentive driving, the range of movement of the driver's line of sight is concentrated toward a central area (Reference Document: "Detection System of Gaze Direction for Excessive Concentration through Cellular Phone Use and Inattention" Shinji Mita, 2002 ITS World Congress paper). Thus, it is possible to estimate a level of alertness from line-of-sight movement, and calculate visibility corresponding to a driver's state by changing visibility according to the level of alertness.

Also, previous research has demonstrated that when there are many objects to which attention should be paid around a traveling vehicle, the peripheral vision range narrows (Reference Document: "Drivers' Visual Attention Characteristics" Automotive Technology, Vol. 58, No. 12, 2004). Thus, it is possible to calculate visibility corresponding to environmental information by changing visibility according to the number of objects around a vehicle. Furthermore, visibility may also be changed by taking into consideration environmental information such as the level of congestion, weather, brightness, and so forth, that may possibly influence a driver's vision characteristics.

Also, when a driver is concentrating on confirmation of a particular object while driving, attentiveness to the driver's surroundings may decrease and the driver's peripheral vision may narrow, as in a case where a pedestrian at the side of the road catches the driver's attention and the driver is slow to notice a vehicle ahead. Thus, in this kind of case, also, visibility may be changed according to the degree of attentive viewing with respect to an object in order to determine visual contact with an object accurately.

Thus, it is possible to calculate visibility corresponding to a driver's state and environmental information by changing visibility according to the driver's level of alertness and degree of attentive viewing with respect to an object, and the traffic environment, including the number of vehicles around the driver's vehicle, the level of congestion, weather, brightness, and so forth.

In FIG. 17, driving support apparatus 200a has degree-of-attentive-viewing calculating section 250 in addition to the configuration elements in FIG. 8.

Degree-of-attentive-viewing calculating section 250 calculates a degree of attentive viewing of a driver with respect to an object, and outputs this to visibility calculating section 240. This degree-of-attentive-viewing calculating section uses the maximum value of cumulative visibilities calculated on an object-by-object basis by the cumulative visibility calculating section (the cumulative visibility of the object viewed most attentively). As cumulative visibility is an indicator indicating a degree of attentive viewing within a predetermined time, it can be considered highly probable that the higher the maximum value, the greater is the degree to which attentive viewing is concentrated on one object, and the lower is attentiveness with respect to peripheral objects.

Also, since a driver's line-of-sight movement within a predetermined time diminishes during attentive viewing of a particular object, an amount of line-of-sight movement within a predetermined time may be calculated from a line-of-sight direction detected by an eye camera or the like, and the smaller that amount, the higher the degree of attentive viewing with respect to that object may be determined to be.

A degree of attentive viewing calculated dynamically as described above is a parameter that sets or changes a driver's visual field characteristics.

Except for receiving input of a degree of attentive viewing from degree-of-attentive-viewing calculating section 250, visibility calculating section 240 in driving support apparatus 200a has the same functions as visibility calculating section 240 of driving support apparatus 200.

More particularly, in the same way as visibility calculating section 140 shown in FIG. 1, visibility calculating section 240 in driving support apparatus 200a has information on a driver's line of sight and point of attentive viewing as input from line-of-sight detecting section 110, and has object information necessary for safety confirmation as input from object extracting section 130.

Also input to visibility calculating section 240 is dynamic driver information such as driver attribute information, the driver's level of alertness and degree of attentive viewing with respect to an object, and traffic environment information such as the number of vehicles around the driver's vehicle, the level of congestion, weather, brightness, and so forth.

Using these input items of information, visibility calculating section 240 calculates visibility indicating the driver's degree of recognition for each object at a particular point in time according to a distance or angle from the driver's line of sight or point of attentive viewing to the respective objects, and outputs this to cumulative visibility calculating section 150.

In other words, visibility calculating section 240 calculates per-object visibility using driver information, the driver's state (including level of alertness and degree of attentive viewing), and the traffic environment, in addition to a line-of-sight direction angle and relative angle with respect to the object vehicle, and outputs this to cumulative visibility calculating section 150.

As described above, visibility calculating section 240 calculates visibility for an object of a line of sight and point of attentive viewing with a table showing the relationship between a point of attentive viewing and visibility stored in memory 242, and an input line of sight and point of attentive viewing.

Visibility calculating section 240 has a configuration whereby, in addition to visibility calculation being performed using a table in the same way as described above for driving support apparatus 200, if a driver is performing attentive viewing concentrated on a specific object, when applying FIG. 9, even when static driver attribute information indicating that the driver is in his or her twenties is input, if it is estimated that the driver is concentrating on confirmation of a specific object and the driver's peripheral visual field has narrowed, visibility calculating section 240 calculates visibility using visibility curve G3 or G4 having a steeper gradient than visibility curve G2 rather than using visibility curve G2.

Next, operation will be described when degree-of-attentive-viewing calculating section 250 is also used in driving support apparatus 200a.

Figure 18:
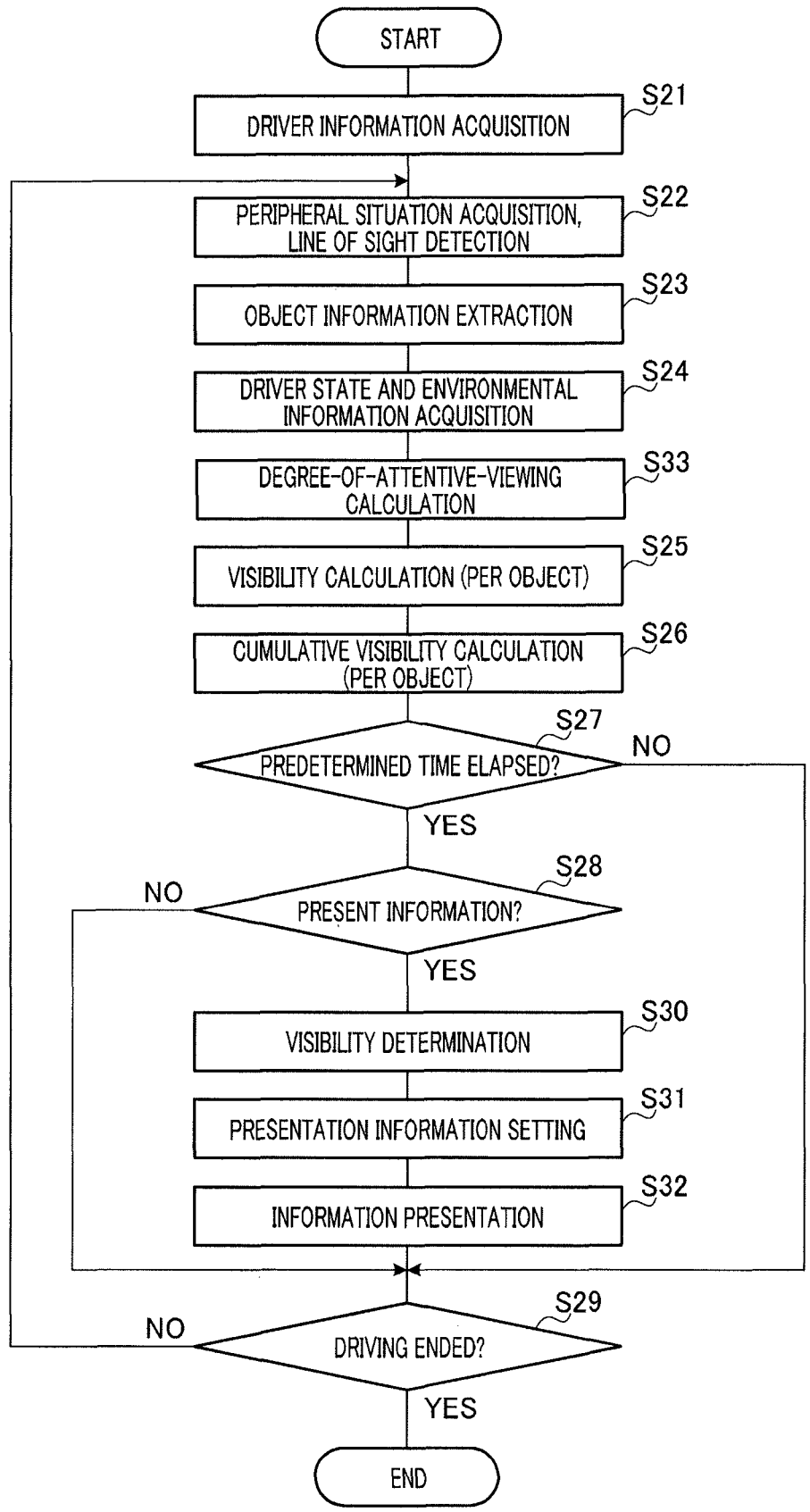
FIG. 18 is a flowchart showing the operation of a sample variant of a driving support apparatus of Embodiment 2 of the present invention.

FIG. 18 is a flowchart showing the operation of a sample variant of a driving support apparatus of Embodiment 2 of the present invention.

The processing shown in FIG. 18 differs from the processing shown in FIG. 10 only in that step S33 processing is performed between step S24 and step S25, the same kind of processing being performed in the other steps. Therefore, only the point of difference will be described here, and a description of operations that are the same as in FIG. 10 will be omitted.

In step S24 in FIG. 18, driver state detecting section 220 acquires the driver's state (here, the driver's level of alertness), environmental information collecting section 230 acquires traffic environment information such as the number of vehicles around the driver's vehicle, the level of congestion, weather, brightness, and so forth, and the processing flow proceeds to step S33.

In step S33, degree-of-attentive-viewing calculating section 250 calculates a degree of attentive viewing. The degree of attentive viewing is calculated based on the maximum value of cumulative visibility if cumulative visibility has already been calculated, or based on an amount of line-of-sight movement from a line-of-sight direction detected by an eye camera. Then the processing flow proceeds to step S25.

In step S25, object information, line-of-sight information, driver state (level of alertness) information, and traffic environment information are input to visibility calculating section 240, and visibility calculating section 240 uses these items of information to calculate visibility to the driver for all objects at that point in time. Then the processing flow proceeds to step S26.

To be specific, in step S25 visibility calculating section 240 calculates per-object visibility at a particular point in time from the angular difference of an object from the line of sight (or distance in an image from the point of attentive viewing) using driver information, the driver's state, the traffic environment, and degree of attentive viewing in addition to an input line-of-sight direction angle and a relative angle of an object with respect to the object vehicle.

Thereafter, the same kind of processing is performed, and driving support apparatus 200a calculates visibility for an object taking into consideration factors influencing a driver's vision characteristics, such as static driver attribute information, the driver's level of alertness, which is driver state information (dynamic driver attribute information), traffic environment (peripheral environment) information, the degree of attentive viewing, and so forth. By this means, information provided to the driver such as oversight of an object for which safety confirmation by the driver is necessary is presented more accurately by also taking the driver's actual driving state into consideration, and safety confirmation can be evoked.

Embodiment 3

Figure 11:
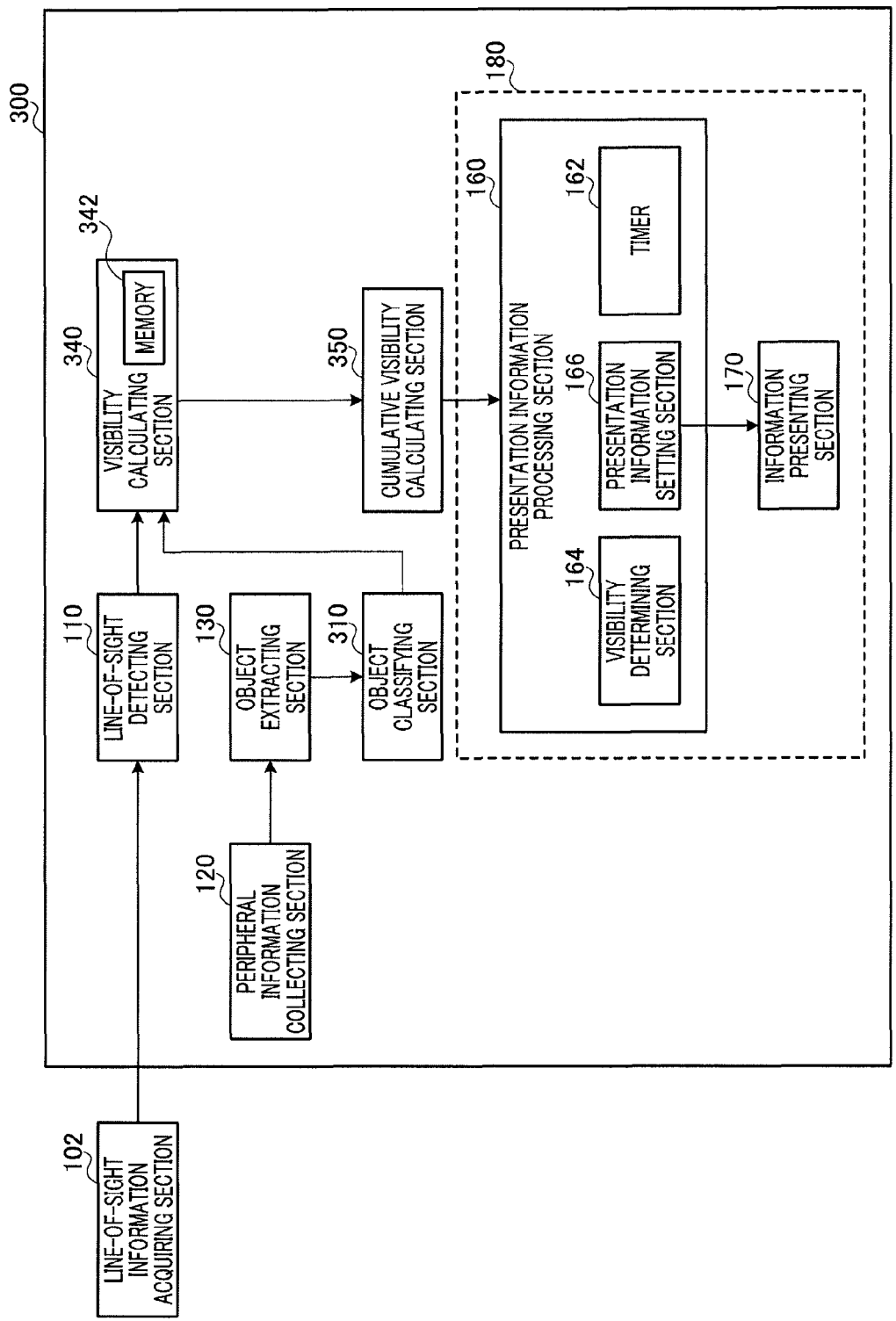
FIG. 11 is a block diagram of a driving support apparatus of Embodiment 3 of the present invention.

FIG. 11 is a block diagram of driving support apparatus 300 of Embodiment 3 of the present invention. Driving support apparatus 300 of Embodiment 3 has a similar basic configuration to that of driving support apparatus 100 corresponding to Embodiment 1 shown in FIG. 1, and therefore identical configuration elements are assigned the same reference codes, and descriptions thereof are omitted here.

This driving support apparatus 300 is configured by adding object classifying section 310 to the configuration of driving support apparatus 100.

Object classifying section 310 classifies a plurality of objects extracted by object extracting section 130 into a number of groups (object groups) according to attributes such as object type, distance, and speed, and outputs classified group (object group) information to visibility calculating section 340.

Using information input from line-of-sight detecting section 110 and object classifying section 310, visibility calculating section 340 calculates visibility indicating the driver's degree of recognition on an object-group by object-group basis for all objects at a particular point in time according to a distance or angle from a line of sight or point of attentive viewing to the respective objects, and outputs this to cumulative visibility calculating section 350.

With regard to visibility calculated by visibility calculating section 340, in addition to an input line of sight and point of attentive viewing, a peripheral visual field calculated from the line of sight and point of attentive viewing is also included as a criterion for deciding visibility. As stated above, a peripheral visual field is a visual field in which information reception is instantaneously possible, this being a range of approximately 10 to 20 degrees centered on the point of attentive viewing.

Visibility calculating section 340 is provided with memory 342, and calculates visibility for an object group of a line of sight and point of attentive viewing with a table showing the relationship between a point of attentive viewing and visibility stored in this memory 342, and an input line of sight and point of attentive viewing.

Cumulative visibility calculating section 350 calculates cumulative visibility by accumulating visibility for all object groups input from visibility calculating section 340 at a point in time on an object-group by object-group basis, and outputs this to presentation information processing section 160 as a per-object-group cumulative value.

Figure 12:
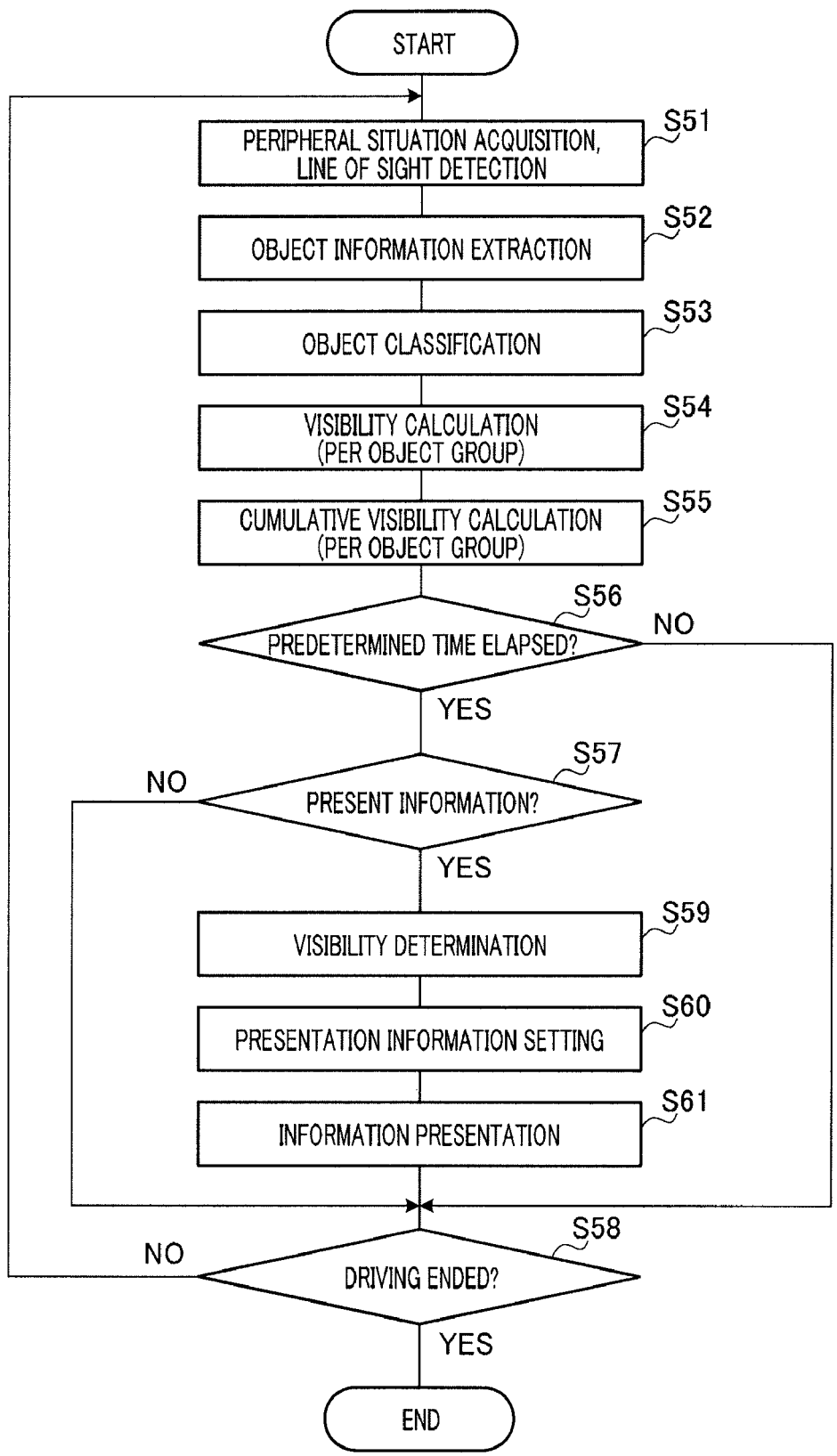
FIG. 12 is a flowchart showing the operation of a driving support apparatus of Embodiment 3 of the present invention.

Next, the operation of driving support apparatus 300 of Embodiment 3 of the present invention will be described using FIG. 12. FIG. 12 is a flowchart showing the operation of driving support apparatus 300 of Embodiment 3 of the present invention.

As shown in FIG. 12, in step S51 peripheral information collecting section 120 in a vehicle equipped with driving support apparatus 300 collects peripheral video (peripheral information) on the periphery (peripheral situation) of the traveling vehicle by means of a camera or the like, and line-of-sight detecting section 110 performs driver's line-of-sight direction (and point of attentive viewing) detection using driver's line-of-sight information acquired by line-of-sight information acquiring section 102, and proceeds to step S52. The peripheral situation acquisition and line-of-sight direction detection are performed at approximately the same timing.

In step S52, object extracting section 130 extracts a relative distance and relative angle with respect to the central position of a traffic environment object or the like such as another vehicle, a pedestrian, a two-wheeled vehicle or suchlike moving object, a traffic sign or marking, a traffic signal, a pedestrian crossing, or a stop sign, from acquired peripheral information (peripheral video) by means of image processing or the like, and proceeds to step S53.

In step S53, object classifying section 310 classifies a plurality of objects extracted by object extracting section 130 into groups (object groups) using object attributes (object type, distance, and speed), and proceeds to step S54.

Here an outline description will be given of object classification processing whereby object classifying section 310 extracts an object group from extracted objects.

FIG. 13 and FIG. 14 are drawings showing schematically processing whereby an object is classified by object classifying section 310 in driving support apparatus 300 of Embodiment 3 of the present invention.

Figure 13B:
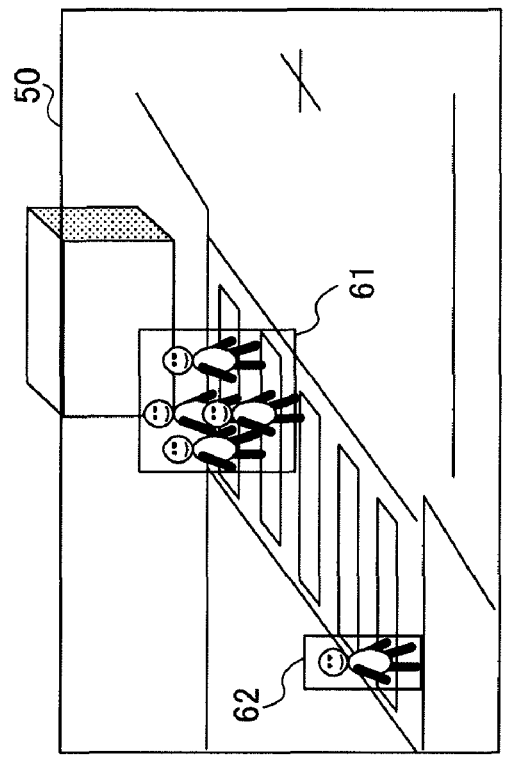
FIG. 13 comprises drawings showing schematically processing whereby an object is classified by an object classifying section in a driving support apparatus of Embodiment 3 of the present invention.
Figure 13A:
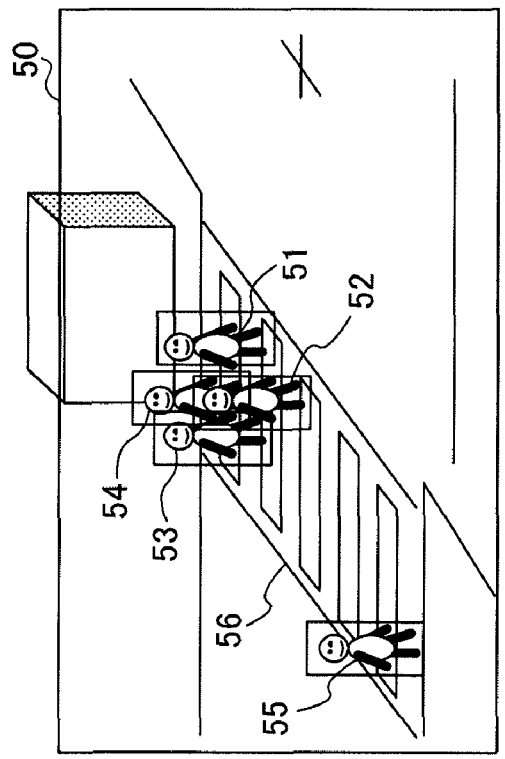

FIG. 13 comprises drawings showing an example in which objects (pedestrians 51 through 55) are classified according to the distance of the objects. As shown in FIG. 13A, object extracting section 130 has extracted pedestrian 55 together with a plurality of pedestrians 51 through 54 on pedestrian crossing 56.

In this scene, with regard to objects extracted by object extracting section 130 (in particular, plurality of pedestrians 51 through 54), objects for which the distance between the centers of the objects (in particular, plurality of pedestrians 51 through 54) is less than or equal to a given value are regarded by object classifying section 310 as being in the same group. By this means, pedestrian groups 61 and 62 are extracted by object classifying section 310 as shown in FIG. 13B.

Meanwhile, FIG. 14 represents scene 70 in which the driver's vehicle makes a right turn, and shows an example in which objects 71 through 77 are classified according to the types of the objects.

In the state shown in FIG. 14A, pedestrians (objects) 71 through 73, traffic signal (object) 74, and oncoming vehicles (objects) 75 through 77 have been extracted by object extracting section 130.

In this scene, object extracting section 130 focuses on the object types (pedestrian, vehicle, traffic equipment) in classifying objects 71 through 77 extracted by object extracting section 130, and furthermore regards objects for which the distance between the centers of the objects is less than or equal to a given value as being in the same group. By this means, pedestrian group 81, traffic signal group 82, and oncoming vehicle group (object group) 83 shown in FIG. 14B are extracted by object classifying section 310.

In addition to using the criteria of distance between objects and object type, object classifying section 310 may also regard objects with a similar speed of movement as being in the same group.

Furthermore, object classifying section 310 may regard objects all moving toward or all moving away from the driver's vehicle or the predicted course of the driver's vehicle as being in the same group, and group objects in this way. Also, object classifying section 310 may use an angle within which objects are present, and group objects that are present within a predetermined angle, and so forth.

Thus, by grouping similar objects, object classifying section 310 can perform visibility determination for these grouped objects. Therefore, annoying warnings can be reduced compared with a case in which visibility determination is performed for individual approaching objects.

In step S54, when object group information and line-of-sight information are input, visibility calculating section 340 calculates visibility to the driver on an object-group by object-group basis for all classified object groups, and proceeds to step S55.

To be specific, in step S54 visibility calculating section 340 calculates per-object-group visibility at a particular point in time from the angular difference of the line of sight and object group from an input line-of-sight direction angle and a relative angle of each object group with respect to the vehicle (or distance in an image from a point of attentive viewing).

In step S55, cumulative visibility calculating section 350 calculates per-object-group cumulative visibility by accumulating input per-object-group visibility at a point in time for each identical object group for a predetermined period, and proceeds to step S56.

In step S56, presentation information processing section 160 determines whether or not a predetermined time has elapsed, proceeds to step S57 if the predetermined time has elapsed, or proceeds to step S58 if the predetermined time has not elapsed. The predetermined time used in the determination in step S56 is a preset time for accumulating calculated visibility.

Determination of whether or not vehicle driving has ended in step S58 is performed based on whether or not the engine of the vehicle has stopped, for example. In step S58, if driving has not ended—that is, if the engine has not stopped—the processing flow returns to step S51, whereas if driving has ended—that is, if the engine has stopped—the processing is terminated.

Thus, visibility calculating section 340 and cumulative visibility calculating section 350 continue visibility calculation and cumulative visibility calculation for an object group for a predetermined time until it is determined by presentation information processing section 160 that a predetermined time has elapsed.

In step S57, presentation information processing section 160 determines whether or not to perform presentation of information in accordance with cumulative visibility input when it was determined that a predetermined time had elapsed, and proceeds to step S58 if information presentation is not performed, or to step S59 if information presentation is performed. If the processing flow proceeds to step S58 and vehicle driving has not ended, the processing flow returns to step S51 and processing is repeated up to cumulative visibility calculation processing.

In step S59, presentation information processing section 160 determines the degree of visibility to (recognition by) the driver of a cumulative visibility object group, and proceeds to step S60.

In step S60, presentation information processing section 160 sets presentation information according to cumulative visibility that reflects the degree of recognition of an object group, and proceeds to step S61.

In step S61, information presenting section 170 presents presentation information set by presentation information processing section 160 to the driver, and proceeds to step S58.

In this embodiment, it is assumed that information is provided to the driver of a vehicle using a display panel as information presenting section 170, and that presentation information is set and displayed on the display panel by presentation information processing section 160 according to per-object-group cumulative visibility. Here, it is assumed that presentation information is displayed on the display panel with a color superimposed on an object group that is an object of safety confirmation (see FIG. 13B and FIG. 14B, for example), and indicates the degree of recognition of that object group. On receiving this, information presenting section 170 changes a presentation color for presentation information indicating a degree of visibility displayed on the display panel according to cumulative visibility.

FIG. 15 shows examples of presentation information presented by information presenting section 170, and comprises conceptual diagrams showing examples of presentation of object groups in accordance with cumulative visibility. FIG. 15 shows a case in which cumulative visibility is calculated for an extracted object group, the color is changed according to the cumulative visibility, and display screens 90 and 93 are presented using the display panel of information presenting section 170.

Figure 15B:
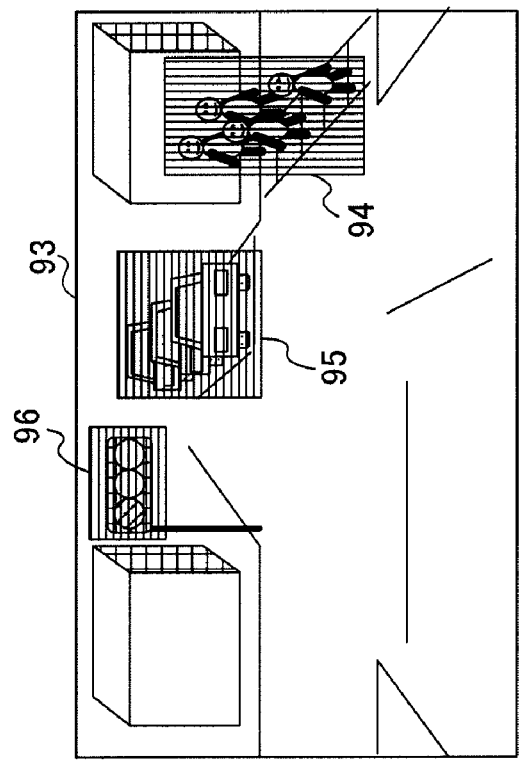
FIG. 15 shows examples of presentation information presented by an information presenting section, and comprises conceptual diagrams showing examples of presentation of object groups in accordance with cumulative visibility.
Figure 15A:
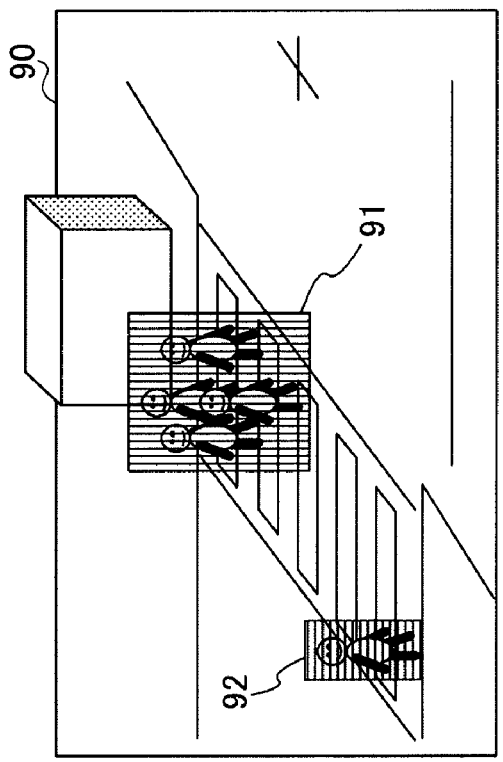

In display screen 90 in FIG. 15A, first pedestrian group 91 and second pedestrian group 92, which are two object groups extracted as object groups by presentation information processing section 160, are displayed.

First pedestrian group 91 and second pedestrian group 92 are displayed (presented) in mutually different colors. Here, first pedestrian group 91 for which it is more necessary to perform safety confirmation is displayed in red, while second pedestrian group 92, with which the driver is in visual contact and to which it is not particularly necessary to pay attention, is displayed in blue.

That is to say, the driver is not in visual contact with first pedestrian group 91 but is in visual contact with second pedestrian group 92.

These pedestrian groups 91 and 92 are extracted respectively as pedestrian groups by object classifying section 310, and corresponding visibilities are extracted by visibility calculating section 340. Using these extracted visibilities, cumulative visibility calculating section 350 calculates respective cumulative visibilities of first pedestrian group 91 and second pedestrian group 92. Then these cumulative visibilities are determined, and presentation information processing section 160 sets presentation information such that they are each displayed in a different color.

On the other hand, in display screen 93 in FIG. 15B, third pedestrian group (object group) 94, oncoming vehicle group (object group) 95, and traffic signal group (object group) 96, which are three object groups extracted as object groups by presentation information processing section 160, are displayed.

Third pedestrian group 94, oncoming vehicle group 95, and traffic signal group 96 are displayed (presented) in mutually different colors according to their cumulative visibility. Here, third pedestrian group 94 for which it is more necessary to perform safety confirmation is displayed in red, while oncoming vehicle group 95 and traffic signal group 96, with which the driver is in visual contact and to which it is not particularly necessary to pay attention, are displayed in blue.

Thus, in display screens 90 and 93 of information presenting section 170, information presentation is performed by information presenting section 170 in accordance with cumulative visibility on an object-group by object-group basis.

Consequently, the driver can grasp which object group(s) should be confirmed. In FIG. 15A, first pedestrian group 91 should be grasped more than second pedestrian group 92, and in FIG. 15B, third pedestrian group 94 should be grasped more than oncoming vehicle group 95 and traffic signal group 96.

In a case in which a display panel that causes the driver to make visual contact is used as information presenting section 170, driving support apparatus 300 may also divide an object group into a plurality of sections, and calculate cumulative visibility for each section.

By this means, a driver can grasp which part has low visibility within a grouped set of objects.

As a dividing method, for example, an object group extracted by object classifying section 310 may be divided into, for instance, four parts—top, bottom, left, and right—and by performing division into pixel units and calculating cumulative visibility on a pixel-by-pixel basis, the driver can grasp intuitively which part has low visibility within a grouped set of objects.

FIG. 16 shows other examples of presentation information presented by information presenting section 170, and comprises conceptual diagrams showing other examples of presentation of object groups in accordance with cumulative visibility.

Figure 16B:
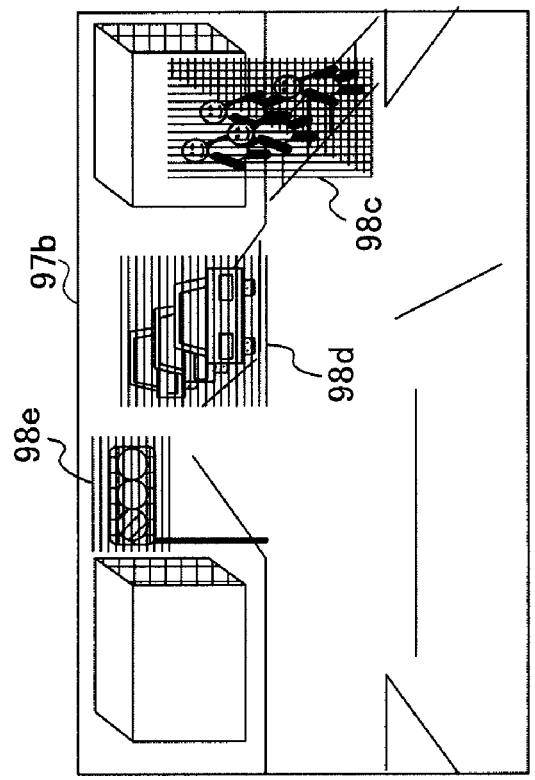
FIG. 16 shows other examples of presentation information presented by an information presenting section, and comprises conceptual diagrams showing other examples of presentation of object groups in accordance with cumulative visibility.
Figure 16A:
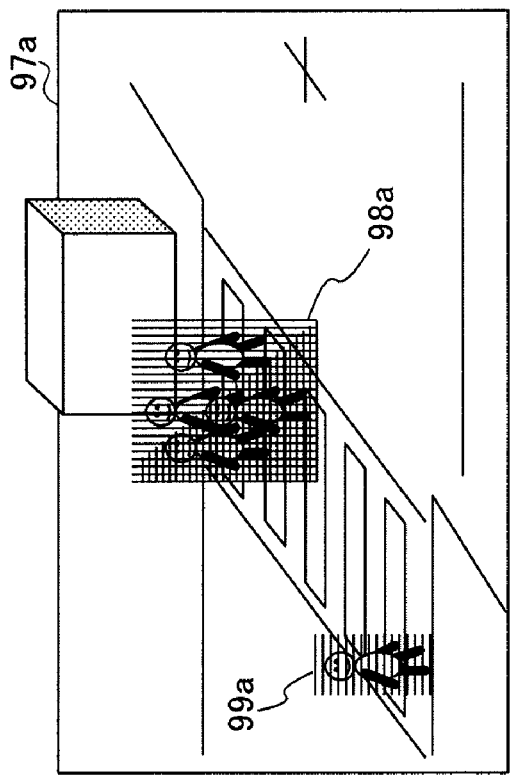

In display screen 97a in FIG. 16A, object groups 98a and 99a are displayed as extracted object groups. Cumulative visibility is calculated for the component pixels of each of these object groups 98*a* and 99*a*, visibility determination is performed according to the calculated cumulative visibilities, and detailed visibilities within object group 98*a* with which visual contact is not being made are displayed in gradations of red (that is, using gradational display of progressively changing colors).

On the other hand, in display screen 97*b* in FIG. 16B, object groups 98*c*, 98*d*, and 98*e* are displayed as extracted object groups. Cumulative visibility is calculated for the component pixels of each of these object groups 98*c*, 98*d*, and 98*e*, visibility determination is performed according to the calculated cumulative visibilities, and detailed visibilities within object group 98*c* with which visual contact is not being made are displayed in gradations of red (that is, using gradational display of progressively changing colors).

That is to say, driving support apparatus 300 calculates cumulative visibilities for the component pixels of an extracted object group. Presentation information processing section 160 performs gradational display of detailed visibilities within an object group according to these calculated cumulative visibilities.

By this means, display using different colors according to cumulative visibility is also performed within an object group, as in display screens 97*a* and 97*b* shown in FIG. 16, making it possible to grasp immediately which part of an object group should be confirmed.

With driving support apparatus 300, when performing gradational display of visibilities within an object group, an object group may be divided and cumulative visibilities calculated and displayed after grouping a plurality of objects constituting safety confirmation objects into an object group, as described above, but this embodiment is not limited to this. For example, provision may also be made for cumulative visibility to be calculated for individual objects, after which an object group is generated at the time of display, and gradational display is performed taking the individual cumulative visibilities into consideration.

In this case, a configuration could be used whereby presentation information processing section 160 is configured so as to have the same kind of function as object classifying section 310 in the configuration of driving support apparatus 100. With this configuration, presentation information processing section 160 sets an information presentation information display mode (for example, gradation such that a color becomes darker as cumulative visibility becomes smaller relative to a comparative threshold value) according to per-object cumulative visibility input from cumulative visibility calculating section 150.

It is assumed that, during driving, processing from peripheral situation acquisition to information presentation is executed sequentially at arbitrary timing.

In driving support apparatuses 100, 200, and 300 of the above embodiments, it is assumed that, when information presenting section 170 performs information presentation, a display panel of a car navigation system or suchlike in-vehicle device is used, forward-view video is displayed on a screen of this display panel, and information presentation in accordance with visibility is performed in that image.

A windshield display that displays car navigation information, road information, and so forth together with the actual view via the windshield may be utilized as information presenting section 170, and information presentation in accordance with visibility may be performed via the windshield.

According to the above embodiments, it is possible to determine whether an object is being viewed or is not being viewed taking into consideration not only recognition via a point of attentive viewing but also recognition via peripheral vision, as a result of which it is possible to reduce annoying warnings.

Also, visibility determination can be performed for an object group, and even when there are many objects for which attentive viewing is necessary, such as when there are many pedestrians on a pedestrian crossing when making a right turn, a warning can be presented for an object group rather than presenting warnings for individual objects, as a result of which it is possible to reduce annoying warnings.

With driving support apparatuses 100, 200, and 300 of the above embodiments, it has been assumed that information presenting section 170 presents information to the driver of a vehicle in which support apparatus 100, 200, or 300 is installed, but the present invention is not limited to this. That is to say, a configuration may also be used whereby, depending on a driver's visual contact state, safety confirmation evocation is directed to an object for which there is a possibility of collision with the vehicle driven by that driver. For example, a configuration may be used in which information presenting section 170 in evocation and control section 180 is a communication section, and a driver's visual contact state is presented to an external apparatus via radio communication. By means of this configuration, provision may be made for information to be presented to a pedestrian or a driver of an oncoming vehicle for which there is a possibility of collision with the vehicle driven by the driver. By this means, the degree of visibility to the driver can be confirmed by a pedestrian or a driver of an oncoming vehicle for which there is a possibility of collision with the vehicle driven by the driver, and the safety of a vehicle driven by a driver for whom the degree of visibility is determined can be ensured.

In the above embodiments, evocation and control section 180 having a configuration element that controls vehicle driving according to presentation information set by presentation information processing section 160 may be used instead of information presenting section 170. For example, a configuration may be used whereby, if object visibility determination by presentation information processing section 160 shows that the degree of visibility to the driver of an object for which safety confirmation is necessary is low, braking of the vehicle is performed and a risk of collision with the object is avoided.

By accurately determining a driver's recognition of a safety confirmation object through not only the driver's attentive viewing of the safety confirmation object but also the driver's peripheral vision, and performing braking of the vehicle being driven, the safety of a traveling vehicle can be ensured.

In the above embodiments, presentation information processing section 160 has a configuration whereby presentation information corresponding to cumulative visibility calculated by cumulative visibility calculating section 150 or 350 is output to information presenting section 170, but the present invention is not limited to this, and a configuration may also be used whereby visibility is input, and presentation information corresponding to input per-object visibility is output. That is to say, a configuration may also be used whereby presentation information processing section 160 judges, changes, and sets presentation information to be output according to input per-object visibility, and outputs presentation information to information presenting section 170.

Specifically, a configuration is used whereby visibility is output to presentation information processing section 160 from visibility calculating section 140, and determination of a driver's degree of recognition of an object of visibility (visibility determination) is performed by visibility determining section 164. Also, presentation information setting section 166 sets or changes presentation information corresponding to visibility for which degree of recognition determination has been performed from visibility determining section 164, and outputs set or changed presentation information to information presenting section 170. By this means, evocation and control section 180 performs safety confirmation evocation for the driver. On receiving this, the driver can determine recognition of a safety confirmation object through not only the driver's attentive viewing of the safety confirmation object but also the driver's peripheral vision, and can ensure the safety of a traveling vehicle.

The disclosure of Japanese Patent Application No. 2006-239591 filed on Sep. 4, 2006, including the specification, drawings and abstract, is incorporated herein by reference in its entirety.

INDUSTRIAL APPLICABILITY

The present invention has an effect of accurately determining a driver's recognition of a safety confirmation object through not only the driver's attentive viewing of the safety confirmation object but also the driver's peripheral vision, and of ensuring the safety of a traveling vehicle by using this, and is useful as a driving support apparatus that detects safety non-confirmation by a driver and performs presentation that prompts the driver to execute safety confirmation.

The invention claimed is:

1. A traveling information providing apparatus comprising:
    a peripheral information collector that acquires peripheral information indicating a peripheral situation of a vehicle equipped with said traveling information providing apparatus;
    an object extractor that extracts a safety confirmation object, which is an object of safety confirmation performed by a driver of the vehicle, from the peripheral information acquired by said peripheral information collector;
    a line-of-sight detector that detects a line-of-sight direction in which the driver is looking;
    a visibility calculator that, using the extracted safety confirmation object and the detected driver's line-of-sight direction, calculates a numerical value of visibility, taking into consideration peripheral vision of the driver, with respect to the safety confirmation object according to a distance or angle from the driver's line-of-sight direction to the safety confirmation object; and
    a controller that performs evocation of safety confirmation or control of a vehicle's driving state based on the calculated numerical value of visibility,
    wherein when the safety confirmation object is in a peripheral visual field of the driver, said visibility calculator calculates the numerical value of the visibility as a value between zero and a value calculated when the safety confirmation object is located in a central visual field, the numerical value of the visibility calculated for the safety confirmation object in the peripheral visual field being different from either zero or the value calculated when the safety confirmation object is located in the central visual field.

2. The traveling information providing apparatus according to claim 1, further comprising a cumulative visibility calculator that accumulates the numerical value of visibility calculated by said visibility calculator for the safety confirmation object during a predetermined period, to calculate cumulative visibility for the safety confirmation object.

3. The traveling information providing apparatus according to claim 2, wherein said controller further comprises a changer that changes an evocation object of the safety confirmation or a control object of vehicle's driving state according to the cumulative visibility calculated for the safety confirmation object.

4. The traveling information providing apparatus according to claim 1, wherein said controller further comprises a changer that changes at least one of an evocation object of the safety confirmation and a control object of the vehicle's driving state according to the numerical value of visibility calculated for the safety confirmation object.

5. The traveling information providing apparatus according to claim 4, wherein:
    said controller evokes the safety confirmation by displaying the safety confirmation object on a display; and
    said changer changes a color of the safety confirmation object displayed on said display according to the numerical value visibility calculated by said visibility calculator.

6. The traveling information providing apparatus according to claim 1, further comprising a driver information inputter that inputs driver information indicating an attribute of a driver,
    wherein said visibility calculator calculates the numerical value of visibility according to the input driver information.

7. The traveling information providing apparatus according to claim 3, wherein:
    said controller evokes the safety confirmation by displaying the safety confirmation object on a display; and
    said changer changes a color of the safety confirmation object displayed on said display according to the cumulative visibility calculated by said cumulative visibility calculator.

8. The traveling information providing apparatus according to claim 1, further comprising a driver state detector that detects a level of alertness of a driver,
    wherein said visibility calculator calculates the numerical value of visibility according to the detected level of alertness.

9. The traveling information providing apparatus according to claim 1, further comprising an environmental information collector that acquires environmental information of a periphery of the vehicle,
    wherein said visibility calculator calculates the numerical value of visibility according to the acquired environmental information of the periphery of the vehicle.

10. The traveling information providing apparatus according to claim 1, further comprising a degree-of-attentive-viewing calculator that measures a degree of concentration of attention to the safety confirmation object,
    wherein said visibility calculator calculates the numerical value of visibility according to the measured degree of concentration of attention.

11. The traveling information providing apparatus according to claim 1, further comprising an object classifier that, when a plurality of safety confirmation objects are extracted by said object extractor, classifies the plurality of safety confirmation objects as an object group according to an attribute of each of the plurality of safety confirmation objects,
    wherein said visibility calculator calculates the numerical value of visibility for the classified object group.

12. The traveling information providing apparatus according to claim 1, further comprising an object classifier that, when a plurality of safety confirmation objects are extracted by said object extractor, classifies the plurality of safety confirmation objects as an object group according to an attribute of each of the plurality of safety confirmation objects, wherein:

said controller evokes the safety confirmation by displaying the object group on a display;

said visibility calculator divides the object group displayed by said display into a plurality of sections, and calculate cumulative visibility for each of the divided sections; and said display displays the divided sections in the object group in a form corresponding to the numerical value of visibility or the cumulative visibility calculated for each section.

13. The traveling information providing apparatus according to claim 1, wherein the central visual field is within an about 2 degrees with respect to the line-of-sight direction, and the peripheral visual field is outside the central visual field and less than about 20 degrees with respect to the line-of-sight direction.

* * * * *